(12) United States Patent
Fan et al.

(10) Patent No.: US 12,574,089 B2
(45) Date of Patent: Mar. 10, 2026

(54) CHANNEL STATE INFORMATION FEEDBACK METHOD AND COMMUNICATION APPARATUS

(71) Applicant: HUAWEI TECHNOLOGIES CO., LTD., Shenzhen (CN)

(72) Inventors: Li Fan, Shanghai (CN); Shibin Ge, Shanghai (CN); Jie Wang, Shanghai (CN); Zhimeng Zhong, Moscow (RU); Qibo Qin, Shanghai (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 18/358,459

(22) Filed: Jul. 25, 2023

(65) Prior Publication Data

US 2024/0030981 A1    Jan. 25, 2024

Related U.S. Application Data

(63) Continuation of application No. PCT/CN2021/074573, filed on Jan. 31, 2021.

(51) Int. Cl.
*H04B 7/06* (2006.01)

(52) U.S. Cl.
CPC ......... *H04B 7/0626* (2013.01); *H04B 7/0639* (2013.01)

(58) Field of Classification Search
None
See application file for complete search history.

(56) References Cited

U.S. PATENT DOCUMENTS

| | | | | |
|---|---|---|---|---|
| 10,491,344 B2 * | 11/2019 | Qiu | ........................... | H04L 1/06 |
| 10,868,603 B2 * | 12/2020 | Rahman | ............... | H04B 7/0469 |

(Continued)

FOREIGN PATENT DOCUMENTS

| | | | | |
|---|---|---|---|---|
| AU | 2017336900 A1 * | 5/2019 | .......... | H04B 7/0639 |
| AU | 2019421319 A1 * | 7/2021 | .......... | H04B 7/0481 |

(Continued)

OTHER PUBLICATIONS

A. Hindy, U. Mittal and T. Brown, "CSI Feedback Overhead Reduction for 5G Massive MIMO Systems," 2020 10th Annual Computing and Communication Workshop and Conference (CCWC), Las Vegas, NV, USA, 2020, pp. 0116-0120. (Year: 2020).*

(Continued)

*Primary Examiner* — Berhanu Tadese
(74) *Attorney, Agent, or Firm* — HAUPTMAN HAM, LLP

(57) ABSTRACT

This application discloses a channel state information feedback method and a communication apparatus. The method includes: determining channel state information based on a first codebook, and sending the channel state information. The first codebook is determined based on a channel represented by one or more spatial-frequency domain column vectors, and the one or more spatial-frequency domain column vectors indicate the channel in joint spatial-frequency domain. In this solution, the first codebook may be determined based on the channel represented by the one or more spatial-frequency domain column vectors. Because the one or more spatial-frequency domain column vectors may represent the channel in joint spatial-frequency domain, that is, the first codebook represents the channel based on joint spatial-frequency domain, a joint spatial-frequency domain feature may be fully used, to explore a sparse feature of the channel, thereby improving system performance.

17 Claims, 7 Drawing Sheets

(56) References Cited

U.S. PATENT DOCUMENTS

| | | | | |
|---|---|---|---|---|
| 11,165,483 | B2 * | 11/2021 | Wang | H04B 7/0456 |
| 11,362,707 | B2 * | 6/2022 | Jin | H04B 7/0478 |
| 11,411,620 | B2 * | 8/2022 | Jin | H04B 7/0469 |
| 11,581,925 | B2 * | 2/2023 | Jin | H04L 1/0028 |
| 11,863,262 | B2 * | 1/2024 | Jin | H04B 7/063 |
| 11,863,494 | B2 * | 1/2024 | Wu | H04B 7/0695 |
| 11,901,979 | B2 * | 2/2024 | Liu | H04B 7/063 |
| 11,929,799 | B2 * | 3/2024 | Gao | H04L 5/0091 |
| 11,962,381 | B2 * | 4/2024 | Gao | H04B 7/0634 |
| 11,962,382 | B2 * | 4/2024 | Li | H04B 7/0634 |
| 12,015,464 | B2 * | 6/2024 | Ren | H04B 7/0479 |
| 12,088,384 | B2 * | 9/2024 | Jin | H04B 7/0479 |
| 12,166,552 | B2 * | 12/2024 | Ren | H04B 7/0626 |
| 12,191,954 | B2 * | 1/2025 | Liu | H04L 5/0048 |
| 12,267,132 | B2 * | 4/2025 | Cai | H04B 7/0639 |
| 12,267,829 | B2 * | 4/2025 | Wang | H04W 72/046 |
| 12,348,997 | B2 * | 7/2025 | Ren | H04B 17/3913 |
| 2018/0294851 | A1 * | 10/2018 | Cao | H04B 7/0452 |
| 2019/0229786 | A1 * | 7/2019 | Huang | H04B 7/0478 |
| 2019/0280750 | A1 * | 9/2019 | Rahman | H04L 25/03923 |
| 2021/0194547 | A1 * | 6/2021 | Jin | H04B 7/0456 |
| 2022/0116093 | A1 * | 4/2022 | Liu | H04B 7/0626 |
| 2022/0263560 | A1 * | 8/2022 | Cai | H04B 7/0456 |
| 2022/0393736 | A1 * | 12/2022 | Park | H04B 7/0634 |
| 2023/0009991 | A1 * | 1/2023 | Liu | H04B 7/0626 |
| 2023/0075037 | A1 * | 3/2023 | Liu | H04B 7/0626 |
| 2023/0098191 | A1 * | 3/2023 | Xu | H04B 7/0456 |
| 2024/0030981 | A1 * | 1/2024 | Fan | H04B 7/0639 |
| 2024/0146364 | A1 * | 5/2024 | Liu | H04B 7/0632 |
| 2024/0223257 | A1 * | 7/2024 | Li | H04B 7/0617 |
| 2024/0275462 | A1 * | 8/2024 | Gao | H04W 72/02 |
| 2024/0405834 | A1 * | 12/2024 | Jin | H04B 7/0417 |
| 2025/0212206 | A1 * | 6/2025 | Wang | H04W 72/0453 |

FOREIGN PATENT DOCUMENTS

| | | | | |
|---|---|---|---|---|
| AU | 2020265943 | A1 * | 12/2021 | H04B 7/063 |
| AU | 2019421319 | B2 * | 10/2022 | H04B 7/0456 |
| AU | 2020265943 | B2 * | 4/2023 | H04B 7/063 |
| BR | 112021002889 | A2 * | 5/2021 | H04B 7/10 |
| BR | 112021013640 | A2 * | 9/2021 | H04B 7/0479 |
| CA | 3038852 | A1 * | 4/2018 | H04B 7/0639 |
| CN | 100563235 | C * | 11/2009 | H04L 65/1095 |
| CN | 104067533 | A * | 9/2014 | H04B 7/0639 |
| CN | 105165083 | A * | 12/2015 | H04L 5/0057 |
| CN | 104067533 | B * | 11/2017 | H04B 7/0634 |
| CN | 107689823 | A * | 2/2018 | H04B 7/0639 |
| CN | 108594186 | A * | 9/2018 | G01S 7/023 |
| CN | 109495149 | A * | 3/2019 | H04B 7/0626 |
| CN | 110391887 | A * | 10/2019 | H04W 72/0446 |
| CN | 106170927 | B * | 12/2019 | H04L 5/0048 |
| CN | 110535498 | A * | 12/2019 | H04B 7/0456 |
| CN | 110768700 | A * | 2/2020 | H04B 7/0891 |
| CN | 108594186 | B * | 4/2020 | G01S 7/36 |
| CN | 111525947 | A * | 8/2020 | H04B 7/0478 |
| CN | 110235500 | B * | 12/2020 | H04B 7/0456 |
| CN | 112054825 | A * | 12/2020 | H04B 7/0481 |
| CN | 110768700 | B * | 2/2021 | H04B 7/0456 |
| CN | 112640323 | A * | 4/2021 | H04B 7/0481 |
| CN | 109495149 | B * | 10/2021 | H04B 7/0486 |
| CN | 111525947 | B * | 11/2021 | H04B 7/0478 |
| CN | 113765549 | A * | 12/2021 | H04B 7/0479 |
| CN | 112054825 | B * | 5/2022 | H04B 7/0481 |
| CN | 111431569 | B * | 7/2022 | H04W 24/10 |
| CN | 114844536 | A * | 8/2022 | H04B 7/0481 |
| CN | 115315906 | B * | 8/2023 | H04B 17/309 |
| CN | 116762284 | A * | 9/2023 | H04B 7/06966 |
| CN | 117220726 | A * | 12/2023 | |
| CN | 117375678 | A * | 1/2024 | H04B 7/06 |
| CN | 112640323 | B * | 4/2024 | H04B 7/0481 |
| CN | 113169773 | B * | 4/2024 | H04B 7/0663 |
| CN | 115088224 | B * | 6/2024 | H04B 7/0456 |
| CN | 118488578 | A * | 8/2024 | H04W 72/046 |
| EP | 3480985 | A1 * | 5/2019 | H04L 1/06 |
| EP | 3920431 | A1 * | 12/2021 | H04B 7/0478 |
| EP | 3965308 | A1 * | 3/2022 | H04B 7/063 |
| EP | 3968533 | A1 * | 3/2022 | H04B 7/0481 |
| EP | 3975442 | A1 * | 3/2022 | H04B 7/0479 |
| EP | 4020854 | A1 * | 6/2022 | H04L 25/0212 |
| EP | 4027543 | A1 * | 7/2022 | H04B 17/309 |
| EP | 4040687 | A1 * | 8/2022 | H04B 7/0481 |
| EP | 4044444 | A1 * | 8/2022 | H04B 7/0663 |
| EP | 4087151 | A1 * | 11/2022 | H04B 7/063 |
| EP | 4092919 | A1 * | 11/2022 | H04B 7/0634 |
| EP | 4106221 | A1 * | 12/2022 | H04B 7/0658 |
| EP | 4106246 | A1 * | 12/2022 | H04B 7/0456 |
| EP | 4224905 | A1 * | 8/2023 | H04W 24/10 |
| EP | 4274112 | A1 * | 11/2023 | H04B 7/06966 |
| EP | 4311122 | A2 * | 1/2024 | H04B 7/0481 |
| EP | 4020854 | B1 * | 3/2024 | H04B 7/0626 |
| EP | 4336739 | A1 * | 3/2024 | H04B 7/0663 |
| EP | 4027543 | B1 * | 11/2024 | H04B 7/0626 |
| EP | 4027543 | B9 * | 1/2025 | H04B 7/0626 |
| EP | 4525321 | A2 * | 3/2025 | H04B 7/0479 |
| EP | 4311122 | B1 * | 5/2025 | H04B 7/0481 |
| KR | 100243106 | B1 * | 2/2000 | H04B 1/7103 |
| KR | 20190055220 | A * | 5/2019 | H04B 7/0417 |
| KR | 20210040403 | A * | 4/2021 | H04B 7/0481 |
| KR | 20210109011 | A * | 9/2021 | H04B 7/0663 |
| KR | 20210116590 | A * | 9/2021 | H04B 7/0478 |
| KR | 20210126013 | A * | 10/2021 | H04B 7/0413 |
| KR | 20210153118 | A * | 12/2021 | H04B 7/0479 |
| KR | 20220015397 | A * | 2/2022 | H04B 7/063 |
| KR | 20220079898 | A * | 6/2022 | H04B 7/0639 |
| KR | 20220131993 | A * | 9/2022 | H04B 7/0658 |
| KR | 20240005204 | A * | 1/2024 | H04B 7/0478 |
| KR | 20240029105 | A * | 3/2024 | H04B 7/0479 |
| RU | 2795933 | C2 * | 5/2023 | |
| WO | WO-2017039414 | A1 * | 3/2017 | H04B 7/0486 |
| WO | WO-2018024064 | A1 * | 2/2018 | H04L 5/0007 |
| WO | WO-2018062910 | A1 * | 4/2018 | H04L 5/0091 |
| WO | WO-2018137187 | A1 * | 8/2018 | H04W 72/04 |
| WO | WO-2019047979 | A1 * | 3/2019 | H04B 7/0626 |
| WO | WO-2019172711 | A1 * | 9/2019 | H04L 5/0057 |
| WO | WO-2020020017 | A1 * | 1/2020 | H04W 76/27 |
| WO | WO-2020029937 | A1 * | 2/2020 | H04B 7/0456 |
| WO | WO-2020114476 | A1 * | 6/2020 | H04B 7/0663 |
| WO | WO-2020143461 | A1 * | 7/2020 | H04B 7/0481 |
| WO | WO-2020143577 | A1 * | 7/2020 | H04W 72/54 |
| WO | WO-2020143580 | A1 * | 7/2020 | H04B 7/0639 |
| WO | WO-2020156136 | A1 * | 8/2020 | H04B 7/0478 |
| WO | WO-2020221117 | A1 * | 11/2020 | H04B 7/0413 |
| WO | WO-2020221118 | A1 * | 11/2020 | H04B 7/0479 |
| WO | WO-2020244368 | A1 * | 12/2020 | H04B 7/0481 |
| WO | WO-2021037200 | A1 * | 3/2021 | H04L 25/0212 |
| WO | WO-2021049873 | A1 * | 3/2021 | H04W 72/0453 |
| WO | WO-2021063178 | A1 * | 4/2021 | H04B 17/3913 |
| WO | WO-2021066534 | A1 * | 4/2021 | H04B 7/0639 |
| WO | WO-2021160122 | A1 * | 8/2021 | H04B 7/0658 |
| WO | WO-2021179171 | A1 * | 9/2021 | H04W 72/23 |
| WO | WO-2021189302 | A1 * | 9/2021 | H04W 72/044 |
| WO | WO-2022144128 | A2 * | 7/2022 | H04B 7/0479 |
| WO | WO-2022160322 | A1 * | 8/2022 | H04B 7/06966 |
| WO | WO-2022253023 | A1 * | 12/2022 | H04B 7/0663 |
| WO | WO-2022262545 | A1 * | 12/2022 | H04B 7/0452 |
| WO | WO-2024001744 | A1 * | 1/2024 | H04L 1/0029 |
| WO | WO-2024001859 | A1 * | 1/2024 | H04B 7/06 |
| WO | WO-2024169743 | A1 * | 8/2024 | H04W 72/046 |

OTHER PUBLICATIONS

M. S. Rahman, E. Onggosanusi, H. Si and J. Cho, "CSI feedback based on space-frequency compression," 2020 IEEE 17th Annual Consumer Communications & Networking Conference (CCNC), Las Vegas, NV, USA, 2020, pp. 1-6, (Year: 2020).*

3GPP TSG RAN WG1 Meeting #95 R1-1812242, Nov. 12-16, 2018. Retrieved from: https://www.3gpp.org/ftp/tsg_ran/wg1_rl1/TSGR1_95/Docs/, on Mar. 16, 2025 (Year: 2018).*

3GPP TSG RAN WG1 Meeting #95, R1-1812242, Nov. 2018 (Year: 2018).*

3GPP TS 38.214 V16.4.0 (Dec. 2020), 3rd Generation Partnership Project; Technical Specification Group Radio Access Network; NR; Physical layer procedures for data (Release 16), total 169 pages.

(56) References Cited

OTHER PUBLICATIONS

International Search Report issued in corresponding International Application No. PCT/CN2021/074573, dated Nov. 3, 2021, pp. 1-10.

CATT, CSI enhancements for MTRP and FR1 FDD with partial reciprocity. 3GPP TSG RAN WG1 Meeting #102-e, e-Meeting, Aug. 17-28, 2020, R1-2005689, 8 pages.

CATT, CSI enhancements for MTRP and FR1 FDD with partial reciprocity. 3GPP TSG RAN WG1 Meeting #103-e, e-Meeting, October 26-Nov. 13, 2020, R1-2007830, 10 pages.

NTT Docomo, Inc, Discussion on CSI enhancements. 3GPP TSG RAN WG1 #103-e, e-Meeting, Oct. 26-Nov. 13, 2020, R1-2009180, 11 pages.

Extended European Search Report issued in corresponding European Application No. 21921923.5, dated Jan. 31, 2024, pp. 1-13.

* cited by examiner

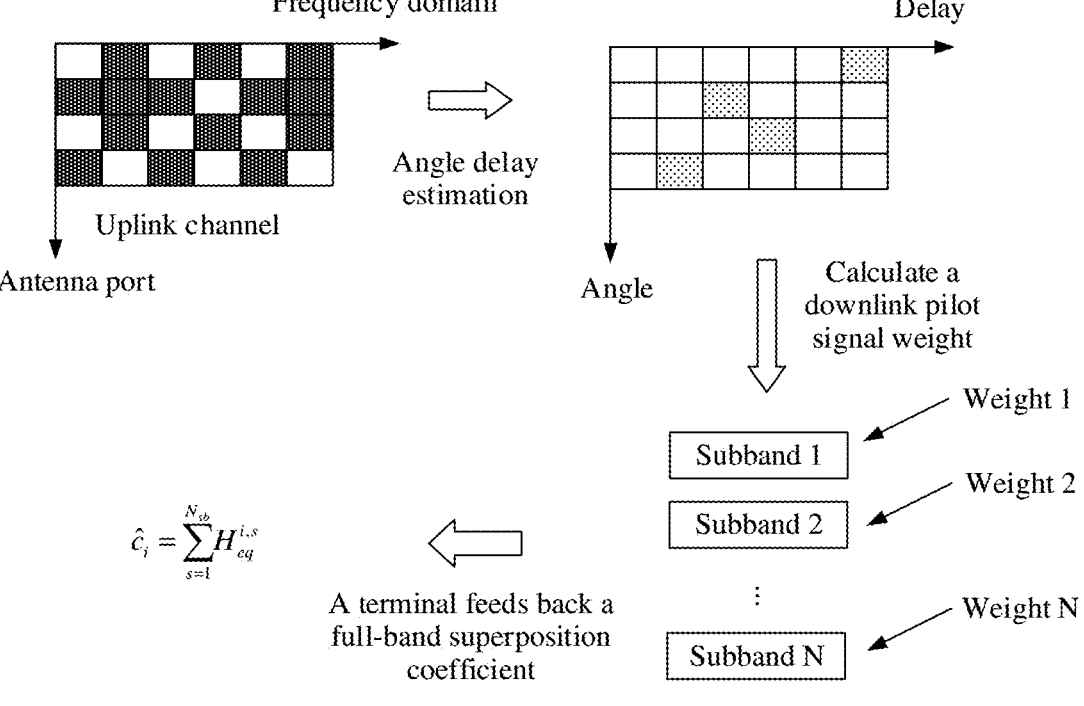

Frequency domain

Delay

Uplink channel

Antenna port

Angle delay estimation

Angle

Calculate a downlink pilot signal weight

Subband 1 ← Weight 1

Subband 2 ← Weight 2

⋮

Subband N ← Weight N $$\hat{c}_i = \sum_{s=1}^{N_{sb}} H_{eq}^{i,s}$$

A terminal feeds back a full-band superposition coefficient

FIG. 5

$$M \boxed{H}^{N_{sb}} \approx M \boxed{S'}^{B} \times B \boxed{C_1}^{K} \times K \boxed{C_2}^{D} \times D \boxed{C_3}^{F} \times F \boxed{F^{'H}}^{N_{sb}}$$

FIG. 6

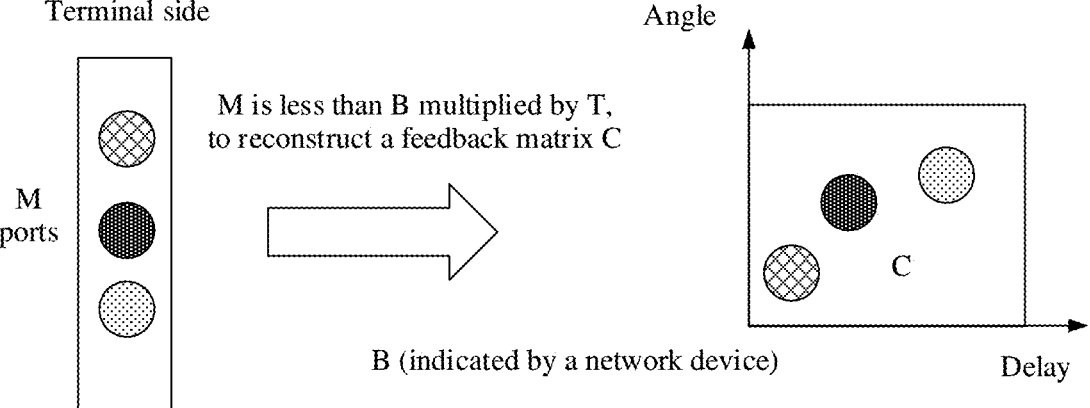

Terminal side

Angle

M is less than B multiplied by T,
to reconstruct a feedback matrix C

M
ports

B (indicated by a network device)

Delay

C

T (indicated by the network device)

FIG. 7

$$M\begin{array}{|c|}\hline \text{H} \\ \hline \end{array}^{N_{sb}} \approx M\begin{array}{|c|}\hline \text{S'} \\ \hline \end{array}^{B} \times B\begin{array}{|c|}\hline C_1 \\ \hline \end{array}^{K} \times K\begin{array}{|c|}\hline C_2 \\ \hline \end{array}^{T} \times T\begin{array}{|c|}\hline F^{\text{H}} \\ \hline \end{array}^{N_{sb}}$$

FIG. 8

$$MN_{sb}\begin{array}{|c|}\hline \text{h} \\ \hline \end{array}^{1} \approx MN_{sb}\begin{array}{|c|}\hline \tilde{U} \\ \hline \end{array}^{P} \times P\begin{array}{|c|}\hline C_2 \\ \hline \end{array}^{1}$$

$$\approx 2\begin{array}{|c|}\hline W_p \\ \hline \end{array}^{2} \otimes N_{sb}\begin{array}{|c|}\hline W_f^* \\ \hline \end{array}^{F} \otimes \frac{M}{2}\begin{array}{|c|}\hline W_s \\ \hline \end{array}^{B} \times 2FB\begin{array}{|c|}\hline C_1 \\ \hline \end{array}^{P} \times P\begin{array}{|c|}\hline C_2 \\ \hline \end{array}^{1}$$

CHANNEL STATE INFORMATION FEEDBACK METHOD AND COMMUNICATION APPARATUS

CROSS-REFERENCE TO RELATED APPLICATIONS

This application is a continuation of International Application No. PCT/CN2021/074573, filed on Jan. 31, 2021, the disclosure of which is hereby incorporated by reference in its entirety.

TECHNICAL FIELD

This application relates to the field of mobile communication technologies, and in particular, to a channel state information feedback method and a communication apparatus.

BACKGROUND

A multiple-input multiple-output (Multiple-Input Multiple-Output, MIMO) technology is a core technology of a long term evolution (Long Term Evolution, LTE) system and 5th generation (5th generation, 5G) new radio (new radio, NR). In the MIMO technology, when sending data to a terminal device, a network device performs signal precoding based on downlink channel state information (Channel State Information, CSI). How to send the data to the terminal device depends on the CSI.

The terminal device may obtain the CSI based on a dual-domain compressed codebook. Because the dual-domain compressed codebook is separately compressed in spatial domain and frequency domain, when performing feedback, the terminal device may feed back one or more selected spatial domain vectors and one or more selected frequency domain vectors to the network device, without separately feeding back a combination coefficient of each subband based on the subband. Therefore, feedback overheads can be reduced.

However, in the dual-domain compressed codebook, only a sparse feature of a channel in angle-delay domain, namely, a feature related to spatial domain information on different subbands, is used for feedback compression. Therefore, a spatial domain base, a frequency domain base, and a full-band combination coefficient is reported, and consequently overheads are still large. In addition, it is specified in a protocol that both the spatial domain base and the frequency domain base are discrete Fourier transform (discrete Fourier transform, DFT) codebooks. Therefore, reporting of the spatial domain base and the frequency domain base limits sparseness of a combination coefficient matrix, and consequently system performance is low.

SUMMARY

This application provides a channel state information feedback method and a communication apparatus, to reduce channel state information feedback overheads and ensure system performance.

According to a first aspect, a channel state information feedback method is provided. The method may be performed by a first communication apparatus. The first communication apparatus may be a communication device or a communication apparatus that can support a communication device in implementing a function required in the method, for example, a chip system. An example in which the communication device is a terminal device is used below for descriptions. The method includes:

determining channel state information based on a first codebook, and sending the channel state information, where the first codebook is determined based on a channel represented by one or more spatial-frequency domain column vectors, and the one or more spatial-frequency domain column vectors indicate the channel in joint spatial-frequency domain.

In some implementations of this application, one or more spatial-frequency domain column vectors may represent a channel in joint spatial-frequency domain. The first codebook may be determined based on the channel represented by the one or more spatial-frequency domain column vectors, that is, the first codebook represents the channel based on joint spatial-frequency domain. In this way, a joint spatial-frequency domain feature may be fully used, to explore a sparse feature of the channel, thereby improving system performance.

According to a second aspect, a channel state information feedback method is provided. The method may be performed by a second communication apparatus. The second communication apparatus may be a communication device or a communication apparatus that can support a communication device in implementing a function required in the method, for example, a chip system. An example in which the communication device is a network device is used below for description. The method includes:

receiving channel state information, and determining a precoding matrix based on the channel state information and a first codebook, where the channel state information is determined based on the first codebook, the first codebook is determined based on a channel represented by one or more spatial-frequency domain column vectors, and the one or more spatial-frequency domain column vectors indicate the channel in joint spatial-frequency domain.

It should be understood that technical effect brought by the second aspect is the same as technical effect of the first aspect. Details are not described herein again.

In some implementations of the first aspect and the second aspect, a plurality of forms of first codebooks may be designed based on the channel represented by the one or more spatial-frequency domain column vectors. The following lists several possible design solutions of the first codebook.

Design solution 1: If two polarization directions of the channel correspond to a same spatial-frequency base, the first codebook may meet the following formula:

$$W = W_1 C_1 C_2$$

The first codebook is W; $W_1$ is a spatial-frequency joint base matrix; $C_1$ is a spatial-frequency joint base correction matrix, and is used to make $W_1$ approximate to W; and $C_2$ is a superposition coefficient matrix corresponding to the spatial-frequency joint base matrix, and indicates weights of one or more spatial-frequency joint bases in $W_1 C_1$ during weighted summation. In this solution, because $W_1$ is the spatial-frequency joint base matrix, compared with a spatial domain-frequency domain compressed codebook, namely, a dual-domain compressed codebook, a right-multiplied matrix is not required for $C_2$, and the terminal device only feeds back the spatial-frequency joint base matrices $C_1$ and $C_2$. Feedback overheads are lower.

In a possible implementation, $W_1 = W_p \otimes W_q$, $W_p$ represents a phase difference between antenna polarization components, $W_q$ is a spatial-frequency joint base matrix, and each column vector in $W_q$ corresponds to one spatial-frequency joint base. In this solution, polarization processing is first performed on the spatial-frequency joint base matrix, and then a spatial-frequency joint base matrix obtained after the polarization processing is corrected by using $C_1$.

Design solution 2: Two polarization directions of the channel correspond to a same spatial-frequency base, and the first codebook meets the following formula:

$$W=(W_p\otimes(W_qC_1))C_2$$

The first codebook is W; $W_p$ represents a phase difference between antenna polarization components; $W_q$ is a spatial-frequency joint base matrix; each column vector in $W_q$ corresponds to one spatial-frequency joint base; $C_1$ is a spatial-frequency joint base correction matrix, and is used to make $W_q$ approximate to W; and $C_2$ is a superposition coefficient matrix corresponding to the spatial-frequency joint base matrix, and indicates weights of one or more spatial-frequency joint bases in $W_qC_1$ during weighted summation. In this solution, the spatial-frequency joint base matrix is first corrected by using $C_1$, and then polarization processing is performed on a corrected spatial-frequency joint base, so that a dimension of $C_1$ can be reduced, and CSI feedback overheads are further reduced.

In the design solution 1 and the design solution 2, one frequency domain base in the spatial-frequency joint base matrix may correspond to a plurality of spatial domain bases, or one spatial domain base in the spatial-frequency joint base matrix may correspond to a plurality of frequency domain bases, and $W_q$ meets the following formula:

$$W_q=W^*_f\otimes W_s, \text{ where } W^*_f \text{ is a conjugate matrix of}$$
$$W_f, W_f \text{ indicates a frequency domain base, and}$$
$$W_s \text{ indicates a spatial domain base.}$$

In the design solution 1 and the design solution 2, one frequency domain base in the spatial-frequency joint base matrix corresponds to one spatial domain base, and $W_q$ meets the following formula:

$$W_q=W^*_f\odot W_s, \text{ where } W^*_f \text{ is a conjugate matrix of}$$
$$W_f, W_f \text{ indicates a frequency domain base, and}$$
$$W_s \text{ indicates a spatial domain base.}$$

Design solution 3: Two polarization directions of the channel correspond to different spatial-frequency bases, and the first codebook includes a codebook corresponding to a first polarization direction and a codebook corresponding to a second polarization direction. In this solution, with reference to differential feedback superposition coefficients and spatial-frequency joint bases of different polarizations, CSI precision can be improved.

For example, the codebook corresponding to the first polarization direction meets $W_2=W_{q,1}C_{1,1}C_{2,1}$, and the codebook corresponding to the second polarization direction meets $W_3=W_{q,2}C_{1,2}C_{2,2}$. $W_{q,1}$ is a spatial-frequency joint base matrix corresponding to the first polarization direction. $W_{q,2}$ is a spatial-frequency joint base matrix corresponding to the second polarization direction. $C_{1,1}$ is a correction matrix of $W_{q,1}$, and is used to make $W_{q,1}$ approximate to $W_2$. $C_{1,2}$ is a correction matrix of $W_{q,2}$, and is used to make $W_{q,2}$ approximate to $W_3$. $C_{2,1}$ is a superposition coefficient matrix corresponding to $W_{q,1}C_{1,1}$, and $C_{2,2}$ is a superposition coefficient matrix corresponding to $W_{q,2}C_{1,2}$. In this solution, there may be a correlation between different polarizations, and feedback may be performed based on differentials between the different polarizations. For example, for feedback of $W_3$, only differentials between $W_3$ and $W_2$ may be fed back, thereby further reducing feedback overheads.

In the design solution 3, one frequency domain base in the spatial-frequency joint base matrix may also correspond to a plurality of spatial domain bases, or one spatial domain base in the spatial-frequency joint base matrix may correspond to a plurality of frequency domain bases.

$W_{q,1}$ meets $W_{q,1}=W^*_{f,1}\otimes W_{s,1}$.

$W_{q,2}$ meets $W_{q,2}=W^*_{f,2}\otimes W_{s,2}$.

$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In the design solution 3, one frequency domain base in the spatial-frequency joint base matrix may alternatively correspond to one spatial domain base.

$W_{q,1}$ meets $W_{q,1}=W^*_{f,1}\odot W_{s,1}$.

$W_{q,2}$ meets $W_{q,2}=W^*_{f,2}\odot W_{s,2}$.

$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

Design solution 4: The first codebook is designed for a case in which the CSI may be fed back based on reciprocity between angles and delays of uplink and downlink physical channels, and the first codebook may meet the following formula:

$$W=W_1C_1C_2$$

The first codebook is W; $W_1$ is a port selection matrix; $C_1$ is a port selection matrix correction matrix, and is used to make $W_1$ approximate to W; and $C_2$ is a superposition coefficient matrix corresponding to the port selection matrix, and indicates a weight of one or more ports in $W_1C_1$ during weighted summation. In this solution, when reporting CSI of a downlink channel, the terminal device only reports $W_1, C_1$, and $C_2$. In other words, the solution of the first codebook for feeding back the CSI based on the reciprocity between the angles and the delays of the uplink and downlink physical channels is provided, so that overheads of feeding back the CSI of the downlink channel by the terminal device can be reduced.

In the design solution 4, the channel state information fed back by the terminal device is the channel state information of the downlink channel, and the channel state information includes some or all elements in $W_1$, $C_1$, and $C_2$.

According to a third aspect, a communication apparatus is provided. The communication apparatus may be a communication device on a terminal side or a communication apparatus that can support a communication device in implementing a function required in a method, for example, a chip or a chip system. The communication apparatus may include a processing module and a transceiver module.

The processing module is configured to determine channel state information based on a first codebook, where the first codebook is determined based on a channel represented by one or more spatial-frequency domain column vectors, and the one or more spatial-frequency domain column vectors indicate a channel in joint spatial-frequency domain.

The transceiver module is configured to send the channel state information.

According to a fourth aspect, a communication apparatus is provided. The communication apparatus may be a communication device on a network side or a communication apparatus that can support a communication device in implementing a function required in a method, for example, a chip or a chip system. The communication apparatus may include a processing module and a transceiver module.

The transceiver module is configured to receive channel state information, where the channel state information is determined based on a first codebook, the first codebook is determined based on a channel represented by one or more spatial-frequency domain column vectors, and the one or more spatial-frequency domain column vectors indicate the channel in joint spatial-frequency domain.

The processing module is configured to determine a precoding matrix based on the channel state information and the first codebook.

In some implementations of the third aspect and the fourth aspect, if two polarization directions of the channel correspond to a same spatial-frequency base, the first codebook may meet the following formula:

$$W = W_1 C_1 C_2$$

The first codebook is W; $W_1$ is a spatial-frequency joint base matrix; $C_1$ is a spatial-frequency joint base correction matrix, and is used to make $W_1$ approximate to W; and $C_2$ is a superposition coefficient matrix corresponding to the spatial-frequency joint base matrix, and indicates weights of one or more spatial-frequency joint bases in $W_1 C_1$ during weighted summation.

In a possible implementation, $W_1 = W_p \otimes W_q$, $W_p$ represents a phase difference between antenna polarization components, $W_q$ is a spatial-frequency joint base matrix, and each column vector in $W_q$ corresponds to one spatial-frequency joint base.

In some implementations of the third aspect and the fourth aspect, two polarization directions of the channel correspond to a same spatial-frequency base, and the first codebook meets the following formula:

$$W = (W_p \otimes (W_q C_1)) C_2$$

The first codebook is W; $W_p$ represents a phase difference between antenna polarization components; $W_q$ is a spatial-frequency joint base matrix; each column vector in $W_q$ corresponds to one spatial-frequency joint base; $C_1$ is a spatial-frequency joint base correction matrix, and is used to make $W_q$ approximate to W; and $C_2$ is a superposition coefficient matrix corresponding to the spatial-frequency joint base matrix, and indicates weights of one or more spatial-frequency joint bases in $W_q C_1$ during weighted summation. In this solution, the spatial-frequency joint base matrix is first corrected by using $C_1$, and then polarization processing is performed on a corrected spatial-frequency joint base, so that a dimension of $C_1$ can be reduced, and CSI feedback overheads are further reduced.

In a possible implementation, one frequency domain base in the spatial-frequency joint base matrix may correspond to a plurality of spatial domain bases, or one spatial domain base in the spatial-frequency joint base matrix may correspond to a plurality of frequency domain bases, and $W_q$ meets the following formula:

$W_q = W^*_f \otimes W_s$, where $W^*_f$ is a conjugate matrix of $W_f$, $W_f$ indicates a frequency domain base, and $W_s$ indicates a spatial domain base.

In a possible implementation, one frequency domain base in the spatial-frequency joint base matrix corresponds to one spatial domain base, and $W_q$ meets the following formula:

$W_q = W^*_f \odot W_s$, where $W^*_f$ is a conjugate matrix of $W_f$, $W_f$ indicates a frequency domain base, and $W_s$ indicates a spatial domain base.

In some implementations of the third aspect and the fourth aspect, two polarization directions of the channel correspond to different spatial-frequency bases, and the first codebook includes a codebook corresponding to a first polarization direction and a codebook corresponding to a second polarization direction.

In a possible implementation, the codebook corresponding to the first polarization direction meets $W_2 = W_{q,1} C_{1,1} C_{2,1}$, and the codebook corresponding to the second polarization direction meets $W_3 = W_{q,2} C_{1,2} C_{2,2}$. $W_{q,1}$ is a spatial-frequency joint base matrix corresponding to the first polarization direction. $W_{q,2}$ is a spatial-frequency joint base matrix corresponding to the second polarization direction. $C_{1,1}$ is a correction matrix of $W_{q,1}$, and is used to make $W_{q,1}$ approximate to $W_1$. $C_{1,2}$ is a correction matrix of $W_{q,2}$, and is used to make $W_{q,2}$ approximate to $W_2$. $C_{2,1}$ is a superposition coefficient matrix corresponding to $W_{q,1} C_{1,1}$, and $C_{2,2}$ is a superposition coefficient matrix corresponding to $W_{q,2} C_{1,2}$.

In a possible implementation, one frequency domain base in the spatial-frequency joint base matrix may also correspond to a plurality of spatial domain bases, or one spatial domain base in the spatial-frequency joint base matrix may correspond to a plurality of frequency domain bases.

$W_{q,1}$ meets $W_{q,1} = W^*_{f,1} \otimes W_{s,1}$.

$W_{q,2}$ meets $W_{q,2} = W^*_{f,2} \otimes W_{s,2}$.

$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In a possible implementation, one frequency domain base in the spatial-frequency joint base matrix may alternatively correspond to one spatial domain base.

$W_{q,1}$ meets $W_{q,1} = W^*_{f,1} \odot W_{s,1}$.

$W_{q,2}$ meets $W_{q,2} = W^*_{f,2} \odot W_{s,2}$.

$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In some implementations of the third aspect and the fourth aspect, the first codebook may meet the following formula:

$$W = W_1 C_1 C_2$$

The first codebook is W; $W_1$ is a port selection matrix; $C_1$ is a port selection matrix correction matrix, and is used to make $W_1$ approximate to W; and $C_2$ is a superposition coefficient matrix corresponding to the port selection matrix, and indicates a weight of one or more ports in $W_1 C_1$ during weighted summation.

In a possible implementation, the channel state information fed back by the terminal device is channel state information of a downlink channel, and the channel state information includes some or all elements in $C_1$ and $C_2$.

It should be understood that technical effect of the third aspect and the fourth aspect and the possible implementations of the third aspect and the fourth aspect are the same as those of the first aspect and the second aspect and the possible implementations of the first aspect and the second aspect. Details are not described herein again.

According to a fifth aspect, this application provides a communication apparatus. The communication apparatus may be the communication apparatus according to the third aspect or the fourth aspect, and optionally, may be a device or a chip or a chip system in a device. The communication apparatus includes a processor. Optionally, the communication apparatus further includes a communication interface. Optionally, the communication apparatus further includes a memory. The memory is configured to store a computer program, instructions, or data. The processor is coupled to the memory and the communication interface. When the processor reads the computer program or the instructions or the data, the communication apparatus is enabled to perform the method according to any one of the foregoing aspects.

It should be understood that the communication interface may be a transceiver in the communication apparatus, for example, implemented by using an antenna, a feeder, a codec, or the like in the communication apparatus. Alternatively, if the communication apparatus is a chip disposed in a device, the communication interface may be an input/output interface of the chip, for example, an input/output circuit or a pin, configured to input/output instructions, data, or a signal. The transceiver is used by the communication apparatus to communicate with another device. For example, when the communication apparatus is a terminal device, the another device is a network device; or when the communication apparatus is a network device, the another device is a terminal device.

According to a sixth aspect, a chip system is provided. The chip system includes a processor, and may further include a memory, configured to implement the method performed by the communication apparatus according to the third aspect or the fourth aspect. In a possible implementation, the chip system further includes the memory, configured to store program instructions and/or data. The chip system may include a chip, or may include a chip and another discrete device.

According to a seventh aspect, a communication system is provided. The communication system includes the communication apparatus according to the third aspect and the communication apparatus according to the fourth aspect.

According to an eighth aspect, this application provides a computer-readable storage medium. The computer-readable storage medium stores a computer program, and when the computer program is run, the method according to any one of the foregoing aspects is implemented.

According to a ninth aspect, a computer program product is provided. The computer program product includes computer program code, and when the computer program code is run, the method according to any one of the foregoing aspects is performed.

For beneficial effect of the fifth aspect to the ninth aspect and the implementations of the fifth aspect to the ninth aspect, refer to descriptions of beneficial effect of the first aspect or the second aspect and the implementations of the first aspect or the second aspect.

BRIEF DESCRIPTION OF DRAWINGS

FIG. 5 is a schematic flowchart of a CSI obtaining solution based on partial FDD reciprocity;

FIG. 6 is a schematic diagram of decomposition of a channel matrix according to an embodiment of this application;

FIG. 7 is a schematic diagram of indicating a location of an angle-delay pair according to an embodiment of this application;

FIG. 8 is another schematic diagram of decomposition of a channel matrix according to an embodiment of this application;

FIG. 9 is a schematic diagram of matrix decomposition of a spatial-frequency joint channel h according to an embodiment of this application;

DESCRIPTION OF EMBODIMENTS

To make objectives, technical solutions, and advantages of embodiments of this application clearer, the following further describes embodiments of this application in detail with reference to the accompanying drawings.

The technical solutions provided in embodiments of this application may be applied to a 5th generation mobile communication technology (5th generation mobile networks, 5G) system, or may be applied to a future communication system or another similar communication system. In addition, the technical solutions provided in embodiments of this application may be applied to a cellular link, a public land mobile network (public land mobile network, PLMN), a machine to machine (machine to machine, M2M) network, an Internet of things (Internet of things, IoT) network, or another network, and may also be applied to a link between devices, for example, a device-to-device (device-to-device, D2D) link. The D2D link may also be referred to as a sidelink (sidelink), and the sidelink may also be referred to as a side link, a secondary link, or the like. In embodiments of this application, the foregoing terms all refer to links established between devices of a same type, and have a same meaning. The link established between devices of a same type may be a link between terminal devices, a link between base stations, a link between relay nodes, or the like. This is not limited in embodiments of this application. For the link between the terminal devices, there is a D2D link defined in third generation partnership project (third generation partnership project, 3GPP) release (Release, Rel)-12/13, and there is also a V2X link, defined by 3GPP for the Internet of vehicles, between vehicles, a vehicle and a mobile phone, or a vehicle and any entity, including Rel-14/15. A V2X link and the like based on a new radio (new radio, NR) system in Rel-16 and subsequent releases that are currently being researched by 3GPP is further included.

Figure 1:
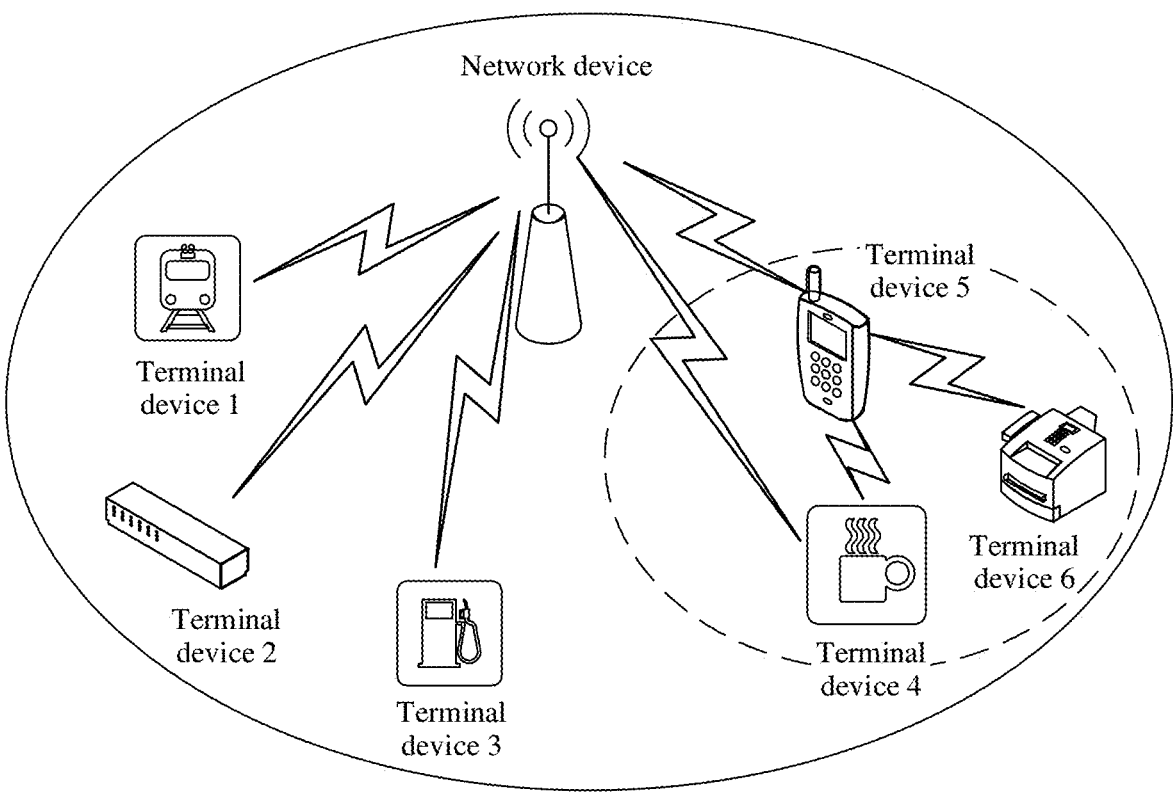
FIG. 1 is a schematic diagram of a network architecture according to an embodiment of this application.

FIG. 1 is an application scenario to which embodiments of this application are applied, or a network architecture to which embodiments of this application are applied. In FIG. 1, a network device and six terminal devices are included. It should be understood that a quantity of terminal devices in FIG. 1 is merely an example, and there may be more or fewer terminal devices. The network architecture may further include another network device, for example, may further include a wireless relay device and a wireless backhaul device, which are not shown in FIG. 1. The network device is a device accessed by the terminal device by using a radio access network, and may be a base station. The network device corresponds to different devices in different systems. For example, the network device may correspond to an evolved NodeB (evolved NodeB, eNB) in a 4th-generation (4th-generation, 4G) mobile communication technology system, and may correspond to a next generation NodeB (generation NodeB, gNB) in a 5G system. The six terminal devices each may be a cellular phone, a smartphone, a portable computer, a handheld communication device, a handheld computing device, a satellite radio apparatus, a global positioning system, a personal digital assistant (personal digital assistant, PDA), and/or any other suitable device configured to perform communication in a wireless communication system, and may be connected to the network device.

Embodiments of this application may be applied to uplink signal transmission, downlink signal transmission, and D2D signal transmission. For downlink signal transmission, a sending device is a network device, and a corresponding receiving device is a terminal device. For uplink signal transmission, a sending device is a terminal device, and a corresponding receiving device is a network device. For D2D signal transmission, a sending device is a terminal device, and a receiving device is also a terminal device. For example, three terminal devices shown in a dashed-line area in FIG. 1 may be applied to D2D signal transmission. A signal transmission direction is not limited in this embodiment of this application.

The terminal device may be a wireless terminal device that can receive scheduling and indication information of the network device. The wireless terminal device may be a device that provides a user with voice and/or data connectivity, a handheld device having a wireless connection function, or another processing device connected to a wireless modem. The wireless terminal device may communicate with one or more core networks or the Internet through a radio access network (such as a radio access network, RAN). The wireless terminal device may be a mobile terminal device, for example, a mobile phone (which is also referred to as a "cellular" phone or a mobile phone (mobile phone)), a computer, and a data card. For example, the wireless terminal device may be a portable, pocket-sized, handheld, computer built-in, or vehicle-mounted mobile apparatus that exchanges language and/or data with the radio access network. For example, the wireless terminal device is a device such as a personal communication service (personal communication service, PCS) phone, a cordless telephone, a session initiation protocol (session initiation protocol, SIP) phone, a wireless local loop (wireless local loop, WLL) station, a PDA, a tablet computer (Pad), and a computer having a wireless transceiver function. The wireless terminal device may also be referred to as a system, a subscriber unit (subscriber unit), a subscriber station (subscriber station), a mobile station (mobile station, MS), a remote station (remote station), an access point (access point, AP), a remote terminal (remote terminal), an access terminal (access terminal), a user terminal (user terminal), a user agent (user agent), a subscriber station (subscriber station, SS), a customer premises equipment (customer premises equipment, CPE), a terminal (terminal), user equipment (user equipment, UE), a mobile terminal (mobile terminal, MT), or the like. Alternatively, the wireless terminal device may be a wearable device and a terminal device in a next-generation communication system, for example, a 5G network, a terminal device in a future evolved public land mobile network (public land mobile network, PLMN), a terminal device in an NR communication system, or the like.

The network device is an entity configured to transmit or receive a signal on a network side, for example, a next-generation NodeB (generation NodeB, gNodeB). The network device may be a device configured to communicate with a mobile device. The network device may be an AP in a wireless local area network (wireless local area network, WLAN), a base transceiver station (base transceiver station, BTS) in a global system for mobile communications (global system for mobile communications, GSM) or code division multiple access (code division multiple access, CDMA), a NodeB (NodeB, NB) in wideband code division multiple access (wideband code division multiple access, WCDMA), an evolved NodeB (evolved NodeB, eNB or eNodeB) in long term evolution (long term evolution, LTE), a relay station, an access point, a vehicle-mounted device, a wearable device, a network device in a future 5G network, a network device in a future evolved PLMN, a gNodeB/gNB in an NR system, or the like. In some deployments, the gNB may include a centralized unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a medium access control (medium access control, MAC) layer, and a physical (physical, PHY) layer. The AAU implements some physical layer processing functions, radio frequency processing, and a function related to an active antenna. Information at the RRC layer eventually becomes information at the PHY layer, or is converted from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application. In addition, in embodiments of this application, the network device serves a cell, and the terminal device communicates with the network device by using a transmission resource (for example, a frequency domain resource, namely, a spectrum resource) used by the cell. The cell may be a cell corresponding to the network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have features of small coverage and low transmit power, and are applicable to providing a high-rate data transmission service. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as a network device.

When sending data to the terminal device, the network device performs modulation and coding and signal precoding based on CSI fed back by the terminal device. To facilitate understanding of embodiments of this application, the following first briefly describes terms used in embodiments of this application.

(1) Precoding technology: When a channel state is known, the network device may process a to-be-sent signal by using a precoding matrix that matches a channel resource, so that a precoded to-be-sent signal adapts to a channel, so as to improve quality (for example, a signal to interference plus noise ratio (signal to interference plus noise ratio, SINR)) of a signal received by a receiving device. In this way, complexity of eliminating impact between channels by the receiving device can be reduced. It can be learned that by using the precoding technology, a sending device and a plurality of receiving devices can perform transmission on a same time-frequency resource. In other words, multi-user multiple-input multiple-output (multiple-user multiple-input multiple-output, MU-MIMO) is implemented. It should be noted that related descriptions of the precoding technology are merely examples for ease of understanding, and are not intended to limit the protection scope of embodiments of this application. In a specific implementation process, the sending device may perform precoding in another manner. For example, when channel information (for example, but not limited to, a channel matrix) cannot be learned of, precoding is performed by using a preset precoding matrix or through weighting. For brevity, specific content thereof is not described in this specification.

(2) Precoding matrix indicator (precoding matrix indicator, PMI): The precoding matrix indicator may indicate a precoding matrix, and the network device restores the precoding matrix based on the PMI. The precoding matrix may be, for example, a precoding matrix determined by the terminal device based on a channel matrix for each frequency domain unit. The frequency domain unit is a unit of a frequency domain resource, and may represent different frequency domain resource granularities. For example, the frequency domain unit may include but is not limited to, a subband (subband), an RB, a subcarrier, a resource block group (resource block group, RBG), or a precoding resource block group (precoding resource block group, PRG). In addition, a frequency domain length of a frequency domain unit may be R times a subband or a frequency domain subband, where R≤1. For example, a value of R may be 1 or ½, or a resource block (resource block, RB). The channel matrix may be determined by the terminal device through channel estimation or the like or based on channel reciprocity. However, it should be understood that a specific method for determining the precoding matrix by the terminal device is not limited to the foregoing descriptions. For a specific implementation, refer to the conventional technology. For brevity, details are not exhaustively described herein.

For example, the precoding matrix may be obtained by performing singular value decomposition (singular value decomposition, SVD) on a channel matrix or a covariance matrix of a channel matrix, or may be obtained by performing eigenvalue decomposition (eigenvalue decomposition, EVD) on a covariance matrix of a channel matrix. It should be understood that the listed manners of determining the precoding matrix are merely examples, and should not constitute any limitation on this application. For a manner of determining the precoding matrix, refer to the conventional technology. For brevity, details are not exhaustively described herein.

(3) Precoding vector: One precoding matrix may include one or more vectors, for example, one or more column vectors. One precoding matrix may be used to determine one or more precoding vectors.

When there is one spatial layer and there is also one polarization direction of a transmit antenna, a precoding matrix is a precoding vector. When there are a plurality of spatial layers and there is one polarization direction of a transmit antenna, a precoding vector may be a component of a precoding matrix at one spatial layer. When there is one spatial layer and there are a plurality of polarization directions of a transmit antenna, a precoding vector may be a component of a precoding matrix in one polarization direction. When there are a plurality of spatial layers and there are also a plurality of polarization directions of a transmit antenna, a precoding vector may be a component of a precoding matrix at one spatial layer and in one polarization direction.

It should be understood that the precoding vector may alternatively be determined by a vector in a precoding matrix, for example, obtained after mathematical transformation is performed on the vector in the precoding matrix. A mathematical transformation relationship between the precoding matrix and the precoding vector is not limited in this application.

(4) Antenna port: The antenna port is also referred to as a port, and may be understood as a transmit antenna identified by a receiving device, or a transmit antenna that can be distinguished in space. One antenna port may be preconfigured for each virtual antenna, each virtual antenna may be a weighted combination of a plurality of physical antennas, and each antenna port may correspond to one reference signal. Therefore, each antenna port may be referred to as a reference signal port, for example, a channel state information reference signal (channel state information reference signal, CSI-RS) port or a sounding reference signal (sounding reference signal, SRS) port. In this embodiment of this application, the antenna port may be a transceiver unit (transceiver unit, TxRU).

(5) Spatial domain vector (spatial domain vector): The spatial domain vector is also referred to as a beam vector, a spatial domain beam base vector, a spatial domain base vector, or a spatial domain base. Each element in the spatial domain vector may represent a weight of each antenna port. Based on the weight that is of each antenna port and that is represented by each element in the spatial domain vector, signals of the antenna ports are linearly superposed, to form an area with a strong signal in a direction in space.

A length of the spatial domain vector may be a quantity Ns of transmit antenna ports in a polarization direction, where Ns≥1, and Ns is an integer. The spatial domain vector may be, for example, a column vector or a row vector whose length is Ns. This is not limited in this application.

Optionally, the spatial domain vector is obtained from a DFT matrix. Each column vector in the DFT matrix may be referred to as a DFT vector. In other words, the spatial domain vector may be a DFT vector. The spatial domain vector may be, for example, a DFT vector defined in a type II (type II) codebook in the NR protocol TS 38.214 release 15 (release 15, R15).

(6) Spatial domain vector set: The spatial domain vector set may include a plurality of spatial domain vectors with different lengths, to correspond to different quantities of antenna ports. In embodiments of this application, a length of a spatial domain vector is Ns. Therefore, a length of each spatial domain vector in a spatial domain vector set to which a spatial domain vector reported by the terminal device belongs is Ns.

In a possible design, the spatial domain vector set may include Ns spatial domain vectors, and any two of the Ns spatial domain vectors may be orthogonal to each other. Each spatial domain vector in the spatial domain vector set may be obtained from a two-dimensional (2-dimensional, 2D)-discrete Fourier transform (discrete Fourier transform, DFT) matrix. 2D may represent two different directions, for example, a horizontal direction and a vertical direction. If quantities of antenna ports in the horizontal direction and the vertical direction are respectively $M_1$ and $M_2$, $Ns=M_1 \times M_2$.

(7) Frequency domain vector (frequency domain vector): The frequency domain vector may also be referred to as a frequency domain base, and may be used to represent a vector of a change rule of a channel in frequency domain. Each frequency domain vector may represent one change rule. When a signal is transmitted through a radio channel, the signal may arrive at a receive antenna through a plurality of paths from a transmit antenna. A multipath delay causes frequency selective fading, namely, a change in a frequency domain channel. Therefore, different frequency domain vectors may be used to represent a change rule of the channel in frequency domain caused by delays on different transmission paths.

A length of the frequency domain vector may be determined based on a quantity of to-be-reported frequency domain units preconfigured in a reporting bandwidth, may be determined based on a length of the reporting bandwidth, or may be a value predefined in a protocol. The length of the frequency domain vector is not limited in this application. The reporting bandwidth may be, for example, a CSI reporting bandwidth (CSI-ReportingBand) carried in a CSI reporting pre-configuration in higher layer signaling (for example, a radio resource control (radio resource control, RRC) message).

The length of the frequency domain vector may be denoted as $N_{sb}$, and $N_{sb}$ is a positive integer. The frequency domain vector may be, for example, a column vector or a row vector whose length is $N_{sb}$. This is not limited in this application.

(8) Frequency domain vector set: The frequency domain vector set may include a plurality of frequency domain vectors with different lengths. In embodiments of this application, a length of a frequency domain vector is $N_{sb}$. Therefore, a length of each frequency domain vector in a frequency domain vector set to which a frequency domain vector reported by the terminal device belongs is $N_{sb}$.

In a possible design, the frequency domain vector set may include $N_{sb}$ frequency domain vectors, and any two of the $N_{sb}$ frequency domain vectors may be orthogonal to each other. Each frequency domain vector in the frequency domain vector set may be obtained from a DFT matrix or an IDFT matrix (namely, a conjugate transposition matrix of the DFT matrix).

(9) Dual-domain compression: The dual-domain compression may include compression of two dimensions: spatial domain compression and frequency domain compression. The spatial domain compression may specifically mean that one or more spatial domain vectors are selected from a spatial domain vector set, as vectors used to construct a precoding vector. The frequency domain compression may mean that one or more frequency domain vectors are selected from a frequency domain vector set, as vectors used to construct a precoding vector. For example, a matrix constructed by using one spatial domain vector and one frequency domain vector may be referred to as a spatial-frequency component matrix. The one or more selected spatial domain vectors and the one or more selected frequency domain vectors may be used to construct one or more spatial-frequency component matrices. A weighted sum of the one or more spatial-frequency component matrices may be used to construct a spatial-frequency precoding matrix corresponding to one spatial layer. In other words, the spatial-frequency precoding matrix may approximately be the weighted sum of the spatial-frequency component matrices constructed by using the one or more selected spatial domain vectors and the one or more selected frequency domain vectors. Based on the spatial-frequency precoding matrix corresponding to the spatial layer, a precoding vector corresponding to each frequency domain unit at the spatial layer may be determined.

Specifically, the one or more selected spatial domain base vectors may form a spatial domain beam base matrix $W_1$, and each column vector in $W_1$ corresponds to one selected spatial domain base vector. The one or more selected frequency domain base vectors may form a frequency domain base matrix $W_3$, and each column vector in $W_3$ corresponds to one selected frequency domain base vector. A precoding matrix W is represented as a result of a linear combination of the one or more selected spatial domain base vectors and the one or more selected frequency domain base vectors:

$$W = W_1 W_2 W_3^H$$

In an implementation, a dual-polarized channel is considered, so that Y spatial domain bases are selected in each polarization direction. In other words, Y is a quantity of spatial domain bases, and a dimension of $W_1$ is $2Ns \times 2Y$. In a possible implementation, same Y spatial domain bases $\{b_s^0, b_s^1, \ldots, b_s^{(Y-1)}\}$ are used in two polarization directions. In this case, $W_1$ may be represented as:

$$W_1 = \begin{bmatrix} b_s^0 & b_s^1 & \ldots & b_s^{(Y-1)} & 0 & 0 & \ldots & 0 \\ 0 & 0 & \ldots & 0 & b_s^0 & b_s^1 & \ldots & b_s^{(Y-1)} \end{bmatrix},$$

$b_s^i$ represents an $i^{th}$ selected spatial domain base, and i=0, 1, . . . , Y−1.

For example, for a spatial layer, if same G frequency domain bases are selected for each spatial domain base, a dimension of $W_3^H$ is $G \times N_{sb}$, and each column vector in $W_3$ corresponds to one frequency domain base. In this case, frequency domain bases corresponding to each spatial domain base are G frequency domain bases in $W_3$. $W_2$ is a spatial-frequency combination coefficient matrix, and a dimension is $2Y \times G$.

An $i^{th}$ row in the spatial-frequency combination coefficient matrix $W_2$ corresponds to an $i^{th}$ spatial domain base in 2Y spatial domain bases, and a $j^{th}$ column in the spatial-frequency combination coefficient matrix $W_2$ corresponds to a $j^{th}$ frequency domain base in the G frequency domain bases. A spatial-frequency combination coefficient vector corresponding to the $i^{th}$ spatial domain base is an $i^{th}$ row vector in the spatial-frequency combination coefficient matrix $W_2$, and a spatial-frequency combination coefficient corresponding to the $i^{th}$ spatial domain base is an element included in the $i^{th}$ row vector in the spatial-frequency combination coefficient matrix $W_2$.

In addition, each of the Y spatial domain bases may alternatively correspond to a different frequency domain base. In this case, $W_3^H=[W_f(0), \ldots, W_f(2Y-1)]^H$, where $W_f^H(i)$ is a matrix with $G_i$ rows and $N_{sb}$ columns formed by $G_i$ frequency domain bases corresponding to the $i^{th}$ spatial domain base; and $$W_2 = \begin{bmatrix} W_2^{(0)} & 0 & 0 \\ 0 & \ddots & 0 \\ 0 & 0 & W_2^{(2Y-1)} \end{bmatrix},$$

where $W_2^{(i)}$ is a spatial-frequency combination coefficient matrix whose dimension is $1 \times G_i$ and corresponding to the $i^{th}$ spatial domain base. A spatial-frequency combination coefficient included in $W_2^{(i)}$ is the spatial-frequency combination coefficient corresponding to the $i^{th}$ spatial domain base.

In addition, a spatial-frequency matrix V may also be represented as $W=W_1W_2W_3$. In this case, each row vector in $W_3$ corresponds to one selected frequency domain base.

In dual-domain compression, compression is performed in both spatial domain and frequency domain. Therefore, when performing feedback, the terminal device may feed back the one or more selected spatial domain bases and the one or more selected frequency domain bases to the network device, and does not need to separately feed back, based on each frequency domain unit (for example, a subband), a spatial-frequency combination coefficient (for example, including an amplitude and a phase) of the subband. Therefore, feedback overheads can be greatly reduced. In addition, because a frequency domain base can represent a change rule of a channel in frequency domain, one or more frequency domain bases are linearly superposed to simulate a change of the channel in frequency domain. In this way, high feedback precision can still be kept, so that a precoding matrix that is restored by the network device based on the feedback of the terminal device can still well adapt to the channel.

(10) Joint spatial-frequency domain compression: The joint spatial-frequency domain compression means that a channel represented by a spatial domain-frequency domain matrix (a spatial domain vector matrix and a frequency domain vector matrix) is represented by a spatial-frequency domain vector (for example, a spatial-frequency domain column vector or a spatial-frequency domain row vector). In other words, the spatial-frequency domain vector may indicate a channel in joint spatial-frequency domain. For example, if the terminal device uses a single receive antenna, the channel may be represented by one spatial-frequency domain vector. If the terminal device uses a plurality of receive antennas, the channel may be represented by a plurality of spatial-frequency domain vectors. A downlink channel is used as an example. It is assumed that the terminal device uses a single antenna, and the channel is a single-polarized channel. A channel H may be represented by using a formula (1), that is, H meets the formula (1):

$$H=SCF^H \tag{1}$$

In the formula (1), $H \in \mathbb{C}^{M \times N}$, $S \in \mathbb{C}^{M \times L}$, $F \in \mathbb{C}^{N \times L}$, and $C \in \mathbb{C}^{L \times L}$. To be specific, C is a diagonal matrix of $L \times L$. M is a quantity of antenna ports of the network device, L is a quantity of paths, N is a quantity of frequency units, and $\mathbb{C}$ represents a complex number set in this specification.

H in the formula (1) is expanded by row. In other words, a channel represented by a spatial domain-frequency domain matrix is represented by a spatial-frequency domain column vector, and the following formula is obtained:

$$h = \begin{bmatrix} H(1,:)^T \\ H(2,:)^T \\ \ldots \\ H(M,:)^T \end{bmatrix} = \begin{bmatrix} H(1,:) & H(2,:) & \ldots & H(M,:) \end{bmatrix}^T,$$

where $(i, :)$ represents an $i^{th}$ row of the matrix, and $i=1, \ldots, M$.

H in the formula (1) is expanded by column. In other words, a channel represented by a spatial domain-frequency domain matrix is represented by a spatial-frequency domain column vector, and the following formula is obtained:

$$h = \begin{bmatrix} H(:,1) \\ H(:,2) \\ \ldots \\ H(:,L) \end{bmatrix},$$

where $(:,i)$ represents an $i^{th}$ column of the matrix, and $i=1, \ldots, L$.

If H in the formula (1) is represented by a column vector, a column vector that is equivalent to the formula (1) may meet a formula (2):

$$h=(F^* \odot S)c \in \mathbb{C}^{MN \times 1} \tag{2}$$

Figure 2:
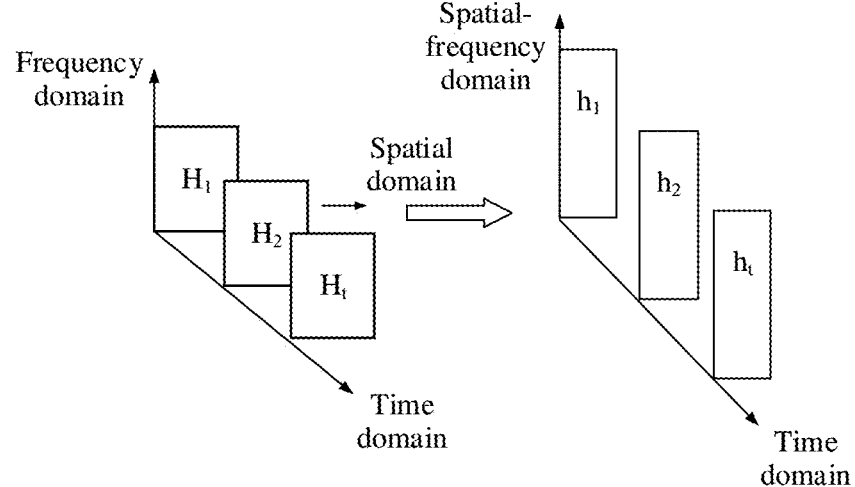
FIG. 2 is a schematic diagram of a column vector representing a channel H.

FIG. 2 is a schematic diagram of representing the channel H by the column vector, and h may also be considered as a representation of the channel in joint spatial-frequency domain (joint domain of spatial domain and frequency domain). For ease of description, h is referred to as a spatial-frequency domain channel in the text. In the formula (2), $c=\text{diag}(C)$, where $\text{diag}(C)$ represents a column vector including diagonal elements of a matrix C; and $(F^* \odot S) \in \mathbb{C}^{MN \times 1}$, where $\odot$ represents a Khatri-Rao product. For example, $A \odot B=[a_1 \otimes b_1 \ldots a_n \otimes b_n]$, $a_i$ is an $i^{th}$ column of A, $\otimes$ is a Kronecker product (Kronecker product), $b_i$ is an $i^{th}$ column of B, and i is an integer greater than 0. $F^*$ is a conjugate matrix of F, and an i $(i=1, \ldots, L)^{th}$ column of a matrix $F^* \odot S$ may meet a formula (3):

$$(F^* \odot S)(:,i)=(F(:,i))^* \otimes S(:,i) \in \mathbb{C}^{MN \times 1} \tag{3}$$

$(:,i)$ represents an $i^{th}$ column of the matrix.

For the channel h represented by a column vector, a statistical covariance matrix of the channel meets a formula (4):

$$R_h = \mathbb{E}\{hh^H\}=U\Lambda U^H \tag{4}$$

$\mathbb{E}$ indicates that an expectation is obtained for a random number/matrix, U is an eigenvector of a channel $R_h$, eigenvalues corresponding to each column of U are elements on a diagonal of a diagonal matrix $\Lambda$, and the elements on the diagonal of $\Lambda$ are arranged in descending order. In this case, an instantaneous channel may meet a formula (5):

$$h=U\hat{h} \tag{5}$$

$\hat{h}$ is a projection of h on U. $\hat{h}_p = U_p h$, and is a projection of h on $U_p$. $U_p = U(:,1: P)$, and indicates that $U_p$ is a matrix formed by selecting 1 to P columns from U. Alternatively, $h \approx U_p \hat{h}_p$. In other words, $U_p \hat{h}_p$ represents an approximation of h.

It should be understood that a channel has a sparse feature in angle-delay domain, that is, only some elements in $\hat{h}$ are non-zero or have large values. In addition, change speeds of an angle and a delay are slow. In other words, within a period of time, it may be considered that U basically remains unchanged, and values of $\hat{h}$ at different moments, such as $\hat{h}_1$, $\hat{h}_2, \ldots,$ and $\hat{h}_t$, change with time. Because spatial-frequency domain joint compression enhances sparseness of a projection coefficient of the channel H on a spatial-frequency joint base, CSI reconstruction precision of the network device can be improved. In addition, different bases may be used in different polarization directions. Compared with using a same base in different polarization directions, this manner can improve system performance.

(11) Spatial-frequency joint vector: The spatial-frequency joint vector may also be referred to as a spatial-frequency joint base, and may represent a vector of a change rule of a channel in joint spatial-frequency domain. In embodiments of this application, if the channel is a single-polarized channel, a dimension of a spatial-frequency joint vector matrix is $((M_1 \times M_2) \times N_{sb}) \times L$. $M_1$ is a quantity of antenna ports that are in a horizontal direction and that are used by the network device for transmission, $M_2$ is a quantity of antenna ports that are in a vertical direction and that are used by the network device for transmission, $N_{sb}$ is a quantity of frequency units, and L is a quantity of paths. It should be understood that, if the channel is a dual-polarized channel, a dimension of a spatial-frequency joint vector matrix is $(2 \times (M_1 \times M_2) \times N_{sb}) \times L$.

(12) Spatial-frequency combination coefficient, amplitude, and phase: The spatial-frequency combination coefficient is also referred to as a combination coefficient, and represents a weight of a vector pair formed by one spatial domain vector and one frequency domain vector that are used to construct a spatial-frequency precoding matrix. There is a one-to-one correspondence between the spatial-frequency combination coefficient and the vector pair formed by one spatial domain vector and one frequency domain vector. In other words, each spatial-frequency combination coefficient corresponds to one spatial domain vector and one frequency domain vector. Specifically, an element in an $i^{th}$ row and a $j^{th}$ column in the spatial-frequency combination coefficient matrix is a combination coefficient corresponding to a vector pair formed by an $i^{th}$ spatial domain vector and a $j^{th}$ frequency domain vector.

(13) Spatial-frequency joint combination coefficient: The spatial-frequency joint combination coefficient is also referred to as a joint combination coefficient, a joint superposition coefficient, or a joint projection coefficient, and represents a weight of one or more frequency domain bases and one or more spatial domain bases in a spatial-frequency joint base matrix during weighted summation. One frequency domain base may correspond to one or more spatial domain bases, and one spatial domain base may correspond to one or more frequency domain bases.

(14) Channel state information (CSI) report (report): The channel state information report is information that is used to describe a channel attribute of a communication link and that is reported by a receive end (for example, the terminal device) to a transmit end (for example, the network device) in a wireless communication system. The CSI report may include, for example, but is not limited to, a precoding matrix indicator (PMI), a rank indicator (rank indicator, RI), a channel quality indicator (channel quality indicator, CQI), a channel state information reference signal (channel state information reference signal, CSI-RS) resource indicator (CSI-RS resource indicator, CRI), and a layer indicator (layer indicator, LI). It should be understood that the enumerated specific content of CSI is merely examples for description, and shall not constitute any limitation on embodiments of this application. The CSI may include one or more of the enumerated items, or may include other information that is different from the enumerated content and that is used to represent the CSI. This is not limited in embodiments of this application.

It should be noted that, in embodiments of this application, matrix and vector transformation is performed in a plurality of places. For ease of description, a unified description is provided herein. A superscript T represents transposition. For example, $A^T$ represents transposition of a matrix (or a vector) A. A superscript H represents conjugate transposition. For example, $A^H$ or $A^H$ represents conjugate transposition of a matrix (or a vector) A. A superscript * represents conjugate. For example, $A^*$ represents conjugate of a matrix (or a vector) A. For brevity, descriptions of a same or similar case are omitted below. In embodiments of this application, a right-multiplied matrix is a frequency domain base, and a left-multiplied matrix is a spatial domain base.

In this specification, unless otherwise stated, "/" represents "or". For example, A/B may represent A or B. "And/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this specification, the word "for example" or "such as" is used to represent giving an example, an illustration, or a description. Any embodiment or design scheme described as an "example" or "for example" in this application should not be explained as being more preferred or having more advantages than another embodiment or design scheme. Exactly, use of the word "example", "for example", or the like is intended to present a relative concept in a specific manner.

In this specification, "indicating" may include "directly indicating" and "indirectly indicating". For example, when a piece of indication information is described, to indicate information I, the indication information may directly indicate I or indirectly indicate I, but it does not necessarily indicate that the indication information carries I.

Information indicated by indication information is referred to as to-be-indicated information. In a specific implementation process, there are a plurality of manners of indicating the to-be-indicated information, for example, but not limited to, the following manners: The to-be-indicated information is directly indicated. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may further be identified and indicated in a unified manner, to reduce indication overheads caused by separately indicating same information. For example, a person skilled in the art should understand that a precoding matrix includes precoding vectors, and the precoding vectors in the precoding matrix may have a same part in terms of composition or another attribute.

Furthermore, specific indication manners may alternatively be various existing indication manners, for example, but not limited to, the foregoing indication manners and various combinations thereof. For details of the various indication manners, refer to the conventional technology. The details are not described in this specification. It can be learned from the foregoing descriptions that, for example, when a plurality of pieces of information of a same type are to be indicated, different information may be indicated in different manners. In a specific implementation process, a required indication manner may be selected based on a specific requirement. The selected indication manner is not limited in embodiments of this application. In this way, the indication manner in embodiments of this application would be understood as covering various methods that can enable a to-be-indicated party to learn of the to-be-indicated information.

It should be understood that when sending data to a terminal, a network device performs signal precoding based on downlink channel state information (Channel State Information, CSI). For a frequency division duplex (Frequency Division Duplex, FDD) system, different frequency bands are used for uplink and downlink transmission, and the uplink channel and the downlink channel do not have instantaneous reciprocity. In other words, the uplink channel and the downlink channel have different transpositions, and a precoding matrix of the downlink channel cannot be obtained by using only the uplink channel. In an existing wireless communication system, an optimal downlink precoding matrix is usually obtained by feeding back a precoding matrix or a precoding matrix index (Precoding Matrix Index, PMI) by a terminal.

Figure 3:
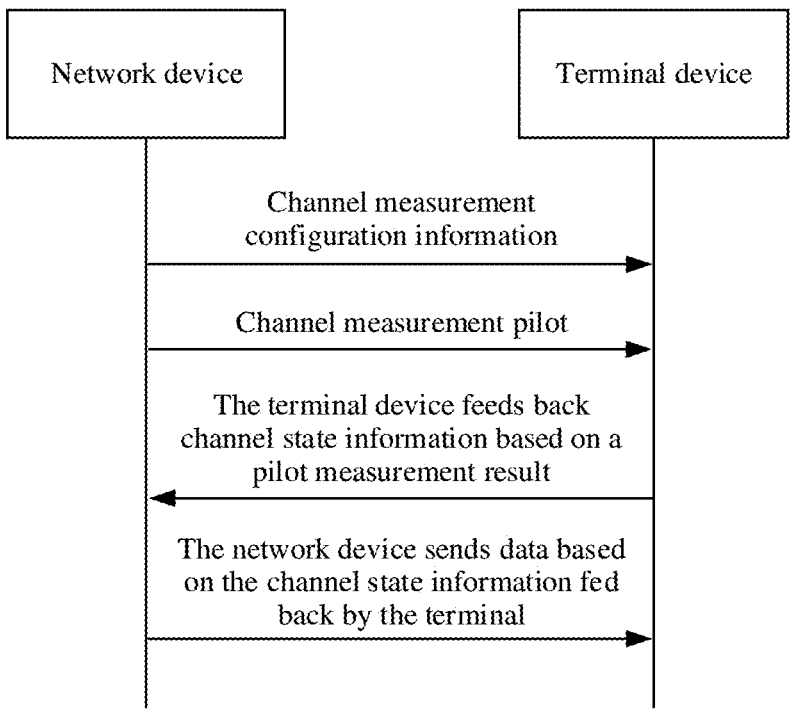
FIG. 3 is a basic flowchart of CSI measurement performed by a network device and a terminal device.

In a conventional FDD system, a base station relies on a terminal to feed back CSI to the base station. FIG. 3 is a basic flowchart of CSI measurement performed by a network device and a terminal device. The network device first sends, to the terminal device, signaling of a configuration used for channel measurement, to notify the terminal device of time and behavior of performing channel measurement. Then, the network device sends a pilot to the terminal device for channel measurement. The terminal device performs measurement based on the pilot sent by the network device, and performs calculation to obtain final CSI. Then, the network device sends data based on the CSI fed back by the terminal device. For example, the network device determines, based on an RI included in the CSI fed back by the terminal device, a quantity of streams for transmitting data to the terminal device. The network device determines, based on a CQI included in the CSI fed back by the terminal device, a modulation order for transmitting data to the terminal device and a channel coding rate. The network device determines, based on a PMI included in the CSI fed back by the terminal device, precoding for transmitting data to the terminal device.

The terminal device feeds back precoding matrix information based on a codebook. In dual-domain compression, compression is performed in both spatial domain and frequency domain. Therefore, when performing feedback, the terminal device may feed back one or more selected spatial domain vectors and one or more selected frequency domain vectors to the network device, and does not need to separately feed back, based on each frequency domain unit (for example, a subband), a combination coefficient (for example, including an amplitude and a phase) of the subband. In this way, feedback overheads can be reduced.

Figure 4:
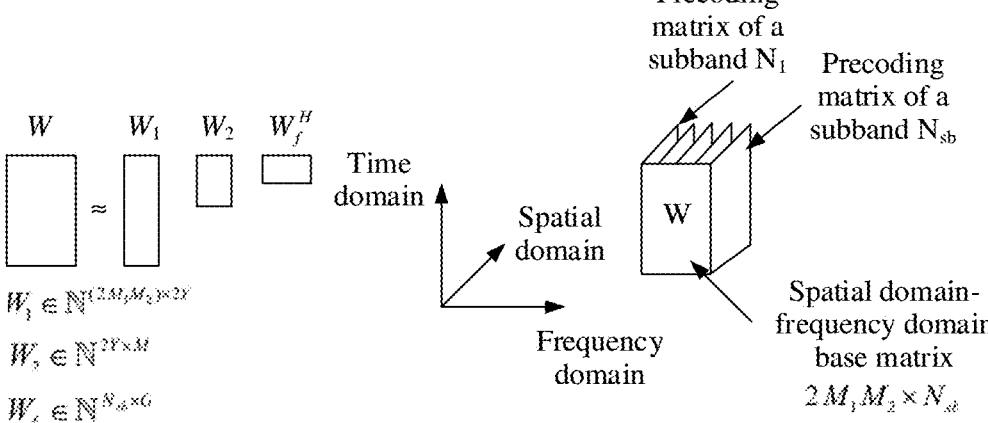
FIG. 4 is a schematic diagram of a possible structure of a spatial domain-frequency domain dual-domain compressed codebook.

For example, FIG. 4 is a schematic diagram of a possible structure of a spatial domain-frequency domain dual-domain compressed codebook. The codebook W meets a formula (6):

$$W = W_1 W_2 W_f^H \tag{6}$$

In the formula (6), $W_1 \in \mathbb{N}^{(2M_1M_2) \times 2Y}$ is a port selection matrix (which may also be referred to as a spatial domain base matrix), $M_1$ is a quantity of horizontal antenna ports of the network device, $M_2$ is a quantity of vertical antenna ports of the network device, Y is a quantity of spatial domain bases, $W_2 \in \mathbb{N}^{2Y \times G}$ is a combination coefficient matrix (which may also be referred to as a spatial-frequency combination coefficient matrix), $W_f \in \mathbb{N}^{N_{sb} \times G}$ is a frequency domain base matrix, and G is a quantity of frequency domain bases. Alternatively, it may be considered that the one or more selected spatial domain vectors may form a spatial domain beam base matrix $W_1$, and each column vector in $W_1$ corresponds to one selected spatial domain vector. The one or more selected frequency domain vectors may form a frequency domain base matrix $W_f$, and each column vector in $W_f$ corresponds to one selected frequency domain vector. $W_2$ may be represented as a combination coefficient corresponding to a linear combination of the one or more selected spatial domain vectors and the one or more selected frequency domain vectors.

In the codebook structure, only a sparse feature of a channel in angle-delay domain, namely, a feature related to spatial domain information on different subbands, is used for feedback compression. Therefore, a spatial domain base, a frequency domain base, and a combination coefficient (a spatial-frequency combination coefficient) are reported, and overheads are large. In addition, it is specified in the protocol that both the spatial domain base and the frequency domain base are DFT codebooks. Therefore, reporting of the spatial domain base and the frequency domain base limits sparseness of a combination coefficient matrix $W_2$, and consequently, system performance is low.

To reduce reporting overheads, it is considered that although the uplink and downlink channels in the FDD system do not have complete reciprocity, uplink and downlink physical channels in the FDD system have partial reciprocity. For example, the uplink and downlink physical channels have reciprocity of a multipath angle and reciprocity of a delay. Based on this, uplink channel information may be used to estimate partial information, namely, information about the multipath angle and the delay. Then, the network device may load the obtained angle and delay to a downlink pilot, and indicate the terminal device to measure and feed back supplementary information required by the network device. Finally, the network device reconstructs the downlink channel or precoding based on information measured by using an uplink pilot and the supplementary information fed back by the terminal device, to support the terminal in feeding back CSI based on reciprocity between angles and delays of the uplink and downlink physical channels.

The CSI is fed back based on the reciprocity between the angles and the delays of the uplink and downlink physical channels. To be specific, the network device projects the uplink channel on a spatial domain base (an angle dimension) and/or a frequency domain base (a delay dimension), and selects a corresponding spatial domain base vector and/or frequency domain base vector based on a value of a projection coefficient (which is also referred to as a superposition coefficient or a combination coefficient). Then, the network device sends a beamformed (beamformed) CSI-RS by using the spatial domain base vector and/or the frequency domain base vector, and the terminal feeds back, to the network device based on the CSI-RS sent by the network device, partial downlink channel information that is not reciprocal between the uplink and downlink physical channels. Alternatively, then, the network device notifies the terminal of the used spatial domain base vector and/or frequency domain base vector, and the terminal feeds back, to the network device based on the spatial domain base vector and/or the frequency domain base vector that are/is indicated by the network device, partial downlink channel information that is not reciprocal between the uplink and downlink physical channels. Then, the network device reconstructs the downlink channel by using the partial downlink channel information that is not reciprocal between the uplink and downlink physical channels and that is fed back by the terminal device, to obtain downlink channel information.

For example, in a representation method of a channel model, a channel may be denoted as $H=SCF^H$. H represents the channel. S is a spatial domain base, and physically corresponds to an angle of arrival/an angle of departure of the network device, that is, is related to channel angle information. F is a frequency domain base, and physically corresponds to a multipath delay of a multipath signal arriving at the network device, that is, is related to channel delay information. C is a spatial-frequency combination coefficient (which is also referred to as a superposition coefficient or a projection coefficient in the text). One element in C corresponds to one vector in S and one vector in F. In other words, one element in C corresponds to one angle-delay pair. It should be understood that, if H is a dual-polarized channel, a dimension of H may be $(2M_1M_2)\times N_{sb}$, where $M_1$ is the quantity of horizontal antenna ports of the network device, $M_2$ is the quantity of vertical antenna ports of the network device, $N_{sb}$ is a quantity of frequency domain units, a dimension of S is $(2M_1M_2)\times 2Y$, C is a matrix of $2Y\times 2Y$, a dimension of F is $N_{sb}\times 2Y$, and Y is a quantity of spatial domain bases.

In a possible implementation, FIG. 5 is a schematic flowchart of a CSI obtaining solution based on FDD partial reciprocity. An uplink channel $H_{UL}$ may be denoted as $H_{UL}=SC_{UL}F^H$, and a downlink channel $H_{DL}$ may be denoted as $H_{DL}=SC_{DL}F^H$. The uplink channel and the downlink channel in the FDD system have reciprocity between angles and delays. In other words, S and F of the uplink channel $H_{UL}$ and the downlink channel $H_{DL}$ are the same. Therefore, the network device may obtain S and F by using the uplink channel. However, $C_{UL}$ is information that is not reciprocal between the uplink channel and the downlink channel, and $C_{DL}$ is information that is not reciprocal between the downlink channel and the uplink channel, and both may be fed back by the terminal device through measurement.

For example, if the network device precodes the CSI-RS by using a spatial-frequency base, the terminal device may obtain an equivalent channel of each port based on the pilot, and perform full-band superposition on the equivalent channel, to obtain a superposition coefficient of a corresponding angle-delay pair, where the superposition coefficient meets a formula (7):

$$\hat{c}_i = \sum_{s=1}^{N_{sb}} H_{eq}^{i,s} \tag{7}$$

In the formula (7), $H_{eq}^{i,s}$ represents an equivalent channel (namely, a channel estimation result) of a port i on a subband s. According to the formula, a superposition coefficient, namely, $\hat{c}_i$, on an $i^{th}$ port of the downlink channel may be obtained, and then $C_{DL}$ is obtained.

The network device may reconstruct the downlink channel or the precoding matrix based on S and F obtained on the uplink channel and $C_{DL}$ fed back by the terminal device.

For example, the terminal device may feedback $C_{DL}$ based on a spatial domain-frequency domain dual-domain compressed codebook, and the codebook may meet a formula (8):

$$W=W_1 \overset{\downarrow}{W} W_f^H \tag{8}$$

In the formula (8), $W_1\in \mathbb{N}^{S\times P1}$ is a port selection matrix (which may also be referred to as a spatial-frequency base selection matrix), S is a quantity of CSI-RS ports sent by the network device, $P_1$ is a quantity of CSI-RS ports selected by the terminal device, and $W_2\in \mathbb{C}^{S\times 1}$ is a superposition coefficient corresponding to each CSI-RS port. In other words, a column quantity of $W_2$ is 1, and column vectors of $W_f\in \mathbb{N}^{N_{sb}\times 1}$ are all 1. $W_2$ is a quantization of $\hat{c}_i$. In this specification, N represents an integer set.

Based on the angle-delay reciprocity between the uplink and downlink physical channels in the FDD system, overheads of feeding back the precoding matrix information can be reduced. However, there may be an offset between angle delay information estimated by using the uplink channel and actual angle delay information of the downlink channel. For example, the terminal device has a plurality of antennas. A sounding reference signal (sounding reference signal, SRS) is sent on some of the plurality of antennas, and is used to estimate frequency domain information of the uplink channel. Correspondingly, the network device can obtain only partial uplink channel information. When channel environments of the plurality of antennas of the terminal device differ greatly, angle delay information obtained by the network device by using the partial channel information may not accurately represent all downlink angle delay information. For another example, when there may be a timing offset between the uplink channel and the downlink channel, there is also an offset between delay information estimated by using the uplink channel and actual delay information of the downlink channel. In this case, an angle-delay pair estimated by using the uplink channel, corresponding to a downlink channel sampling point, is not an angle-delay pair with large power of the downlink channel. Therefore, a large error may exist when the network device reconstructs the downlink channel by using the superposition coefficient fed back by the terminal device and the angle and the delay that are estimated by using the uplink channel.

In another possible implementation, same as that in the foregoing implementation, the network device estimates the angle delay information based on the uplink channel, and loads the obtained angle and delay to the downlink pilot. A difference from the foregoing implementation lies in that the terminal device may perform full-band superposition on the downlink channel to obtain the superposition coefficient matrix C, and the terminal device may divide the superposition coefficient matrix into a plurality of portions, where some portions are reported to the network device in a long periodicity, and some portions are reported to the network device in a short periodicity, to reduce overheads as much as possible. For example, $C=C_1C_2C_3$ may be denoted, and $C_1$, $C_2$, and $C_3$ are calculated based on C. $C_1$ or $C_3$ may be reported to the network device in a long periodicity, and $C_2$ may be reported to the network device in a short periodicity or in an aperiodic manner, to reconstruct the downlink channel.

For ease of understanding, FIG. 6 is a schematic diagram of decomposition of the channel matrix H. As shown in FIG. 6, the channel H may meet a formula (9):

$$H \approx S'C_1C_2C_3F'^H \tag{9}$$

In the formula (9), S' is a spatial domain base (matrix); $C_1$ is a superposition coefficient matrix 1, represents a projection coefficient of an eigenspace of a spatial domain statistical covariance matrix of the downlink channel on the spatial domain base, and may be used to correct the spatial domain base, and therefore $C_1$ may also be referred to as a spatial domain base correction matrix; $C_2$ is a superposition coefficient matrix 2, and represents a projection coefficient of a downlink instantaneous channel on $S'C_1$ and $C_3F'^H$; $C_3$ is a superposition coefficient matrix 3, represents a projection coefficient of an eigenspace of a frequency domain statistical covariance matrix of the downlink channel on a frequency domain base, and may be used to correct the frequency domain base, and therefore $C_3$ may also be referred to as a frequency domain base correction matrix; and F' is the frequency domain base (matrix). A dimension of S' is M×B, M is a quantity of antenna ports, and B is a quantity of spatial domain bases selected by the network device or the terminal device. A dimension of $C_1$ is B×K, and K represents a valid dimension of a downlink spatial domain eigenspace. A dimension of $C_2$ is K×D, and D represents a valid dimension of a downlink frequency domain eigenspace. A dimension of $C_3$ is D×F, and F is a quantity of frequency domain bases selected by the network device or the terminal device. A dimension of F' is $F×N_{sb}$, and $N_{sb}$ is a quantity of subbands.

Correspondingly, the codebook used by the terminal device to feed back the precoding matrix information may meet a formula (10):

$$W = W_1C_1C_2C_3W_f^H \tag{10}$$

In the formula (10), $R_S = \mathbb{E}\{HH^H\} = U_S \Lambda U_S^H$, and $U_S = W_1C_1$, or $U_S \approx W_1C_1$. $R_S$ is a spatial domain statistical covariance matrix of H, $U_S$ is an eigenvector of $R_S$, eigenvalues corresponding to each column of $U_S$ are elements on a diagonal of a diagonal matrix $\Lambda$, and the elements on the diagonal $\Lambda$ are arranged in descending order. $R_F = \mathbb{E}\{H^HH\} = U_F \Lambda U_F^H$, and $U_F = W_fC_3$, or $U_F \approx W_fC_3^H$. $R_F$ is a frequency domain statistical covariance matrix of H, $U_F$ is an eigenvector of $R_F$, eigenvalues corresponding to each column of $U_F$ are the elements on the diagonal of the diagonal matrix $\Lambda$, and the elements on the diagonal $\Lambda$ are arranged in descending order. $W_1$ is a spatial domain base selected by using the uplink channel or the downlink channel. $W_f$ is a frequency domain base selected by using the uplink channel or the downlink channel. $C_1$ is a spatial domain base correction matrix, and $W_1$ is corrected by using the downlink channel, to make $W_1$ approximate to $U_S$. $C_3$ is a frequency domain base correction matrix, and $W_f$ is corrected by using the downlink channel, to make $W_f$ approximate to $U_F$. In other words, the terminal device separately corrects the spatial domain base and the frequency domain base.

It should be understood that if the network device precodes the CSI-RS by using the spatial-frequency base, the terminal device may obtain, in a manner such as full-band superposition, a matrix $C=(C_1C_2C_3)$ corresponding to each port (angle-delay pair). To reconstruct the matrix C, the network device indicates dimensions B and F of the matrix C and an accurate location of the angle-delay pair in an angle-delay space (B×F), as shown in FIG. 7. Because the spatial domain base and the frequency domain base do not change greatly, to avoid a large change range of feedback overheads of the terminal device, the network device may indicate to feed back dimensions K and D of the superposition coefficient matrix $C_2$ in a short periodicity.

Further, only the spatial domain base may be corrected, and the frequency domain base is still obtained by using the uplink channel. To be specific, FIG. 8 is another schematic diagram of decomposition of the channel matrix H, and the channel H meets a formula (11):

$$H = S'C_1C_2F'^H \tag{11}$$

In the formula (11), a dimension of $C_2$ is K×F, and the network device may indicate a dimension K of the feedback superposition coefficient matrix $C_2$.

It can be learned from FIG. 6 and FIG. 8 that a model of the channel H may be denoted as $H=SCF^H$, and the codebook used by the terminal device to feed back the precoding matrix information may meet a formula (12):

$$W = W_1C_1C_2W_f^H \tag{12}$$

In the formula (12), $R_S = \mathbb{E}\{HH^H\} = U_S \Lambda U_S^H$, and $U_S = W_1C_1$ or $U_S = W_1C_1$; $R_F = \mathbb{E}\{H^HH\} = U_F \Lambda U^H$, and $U_F = W_fC_3^H$ or $U_F = W_fC_3^H$. $W_1$ is a spatial domain base selected by using the uplink channel or the downlink channel, and $W_f$ is a frequency domain base selected by using the uplink channel or the downlink channel. $C_1$ is the spatial domain base correction matrix, and $W_1$ is corrected by using the downlink channel, to make $W_1$ approximate to $U_S$. $C_2$ is the superposition coefficient matrix. In other words, the terminal device corrects the spatial domain base, and if the formula (12) is met, the frequency domain base may not be corrected in some instances. Sparseness of projection coefficients of a channel on both the spatial domain base and the frequency domain base is poor. Therefore, when the channel is sparsely represented in spatial domain and frequency domain, a coefficient feature of the channel is not fully explored, and performance can be further improved.

In view of this, embodiments of this application provide a structure of a codebook used for feeding back CSI. A channel is sparsely represented by using the codebook based on a joint spatial-frequency domain, and a joint spatial-frequency domain feature is fully used. In other words, a sparse feature of the channel can be fully explored, thereby improving system performance.

Embodiments of this application are intended to provide a codebook (which may be referred to as a first codebook in the text). A terminal device feeds back CSI to a network device based on the first codebook, so that system performance can be improved, and feedback overheads of the terminal device can be reduced. If the terminal device separately corrects a spatial domain base and a frequency domain base, sparseness of projection coefficients of the channel on the spatial domain base and the frequency domain base is poor, resulting in poor system performance. A design idea of the first codebook in embodiments of this application is roughly as follows: The channel is sparsely represented in joint spatial-frequency domain (namely, joint domain of spatial domain and frequency domain). In other words, the channel is approximated in joint spatial-frequency domain, and the first codebook is designed based on the channel represented in joint spatial-frequency domain. In other words, the first codebook is designed based on the channel h shown in the formula (5). In embodiments of this application, compression feedback is performed on the channel in joint spatial-frequency domain, so that sparseness of projection coefficients of the channel on the spatial domain base, the frequency domain base, and a joint spatial-frequency domain base can be improved. Compared with that the channel is separately compressed in spatial domain and frequency domain, this manner can be used to fully explore sparseness of the channel, thereby improving accuracy of channel state information and improving system performance.

In addition, as described above, for h, a statistical covariance matrix thereof meets the formula (4), namely, $R_h = \mathbb{E}\{hh^H\} = U\Lambda U^H$; and an instantaneous channel thereof may meet the formula (5), namely, $h = U\hat{h} \approx U_p\hat{h}_p$. It should be understood that, when karhunen-loeve (karhunen-loeve, KL) is used for decomposition, and h is expanded by using eigenvectors corresponding to P largest eigenvalues of the matrix $R_h$, namely, first P columns $(U_P)$ of U, a truncation statistical mean square error is the smallest. Therefore, quantization feedback may be performed on $U_P$ in a long periodicity, and quantization feedback may be performed on $\hat{h}_p$ in a short periodicity or in an aperiodic manner. In this way, feedback overheads of the terminal device can be reduced. In other words, in embodiments of this application, the first codebook may be designed based on a rule that different channel features vary at different speeds with time, for example, a feature that path angle-delay information (a spatial-frequency joint base) changes slowly and a path superposition coefficient (a superposition coefficient corresponding to each domain base) changes quickly. Based on the first codebook, the terminal device may feed back a spatial-frequency joint base matrix in a long periodicity, and feed back a superposition coefficient $C_2$ corresponding to a base in a short periodicity, to reduce feedback overheads.

The following uses a downlink channel as an example to describe various design solutions of the first codebook in embodiments of this application. Because the channel is sparsely represented in joint spatial-frequency domain, for ease of description, in the text, h in the formula (5) may also be referred to as a spatial-frequency joint channel. In the following descriptions, an example in which a channel represented by a spatial domain-frequency domain matrix is represented by a spatial-frequency domain column vector and an example in which the terminal device uses a single receive antenna are used. The following uses a first codebook for one spatial layer (rank) as an example.

For example, a channel H is a dual-polarized channel, and channels corresponding to two polarization directions may be denoted as $H_1$ and $H_2$, where H meets $$H = \begin{bmatrix} H_1 \\ H_2 \end{bmatrix},$$

and $H \in \mathbb{N}^{(2M_1 M_2) \times N_{sb}}$, $M_1$ is a quantity of horizontal antenna ports of the network device, $M_2$ is a quantity of vertical antenna ports of the network device, and $N_{sb}$ is a quantity of frequency domain units. A dimension of $H_1$ is $M_1 M_2 \times N_{sb}$, and a dimension of $H_2$ is $M_1 M_2 \times N_{sb}$. According to the formula 2, a spatial-frequency joint channel $h_1$ of the channel $H_1$ is obtained, and a spatial-frequency joint channel $h_2$ of the channel $H_2$ is obtained. The terminal device performs spatial-frequency joint covariance matrix statistics on the downlink channels $h_1$ and $h_2$, to obtain spatial-frequency joint statistics covariance matrices $R_1$ and $R_2$ corresponding to the two polarization directions, where the channel $h_1$ corresponds to $R_1$, and the channel $h_2$ corresponds to $R_2$. SVD or eigen decomposition is performed on $R_1$ to obtain a matrix $U_1$ formed by eigenvectors, and SVD or eigen decomposition is performed on $R_2$ to obtain a matrix $U_2$ formed by eigenvectors. The matrix $U_1$ is truncated, and $P_1$ columns corresponding to $P_1$ eigenvalues with large energy are selected to form a matrix $\tilde{U}_1$. The matrix $U_2$ is truncated, and $P_2$ columns corresponding to $P_2$ eigenvalues with large energy are selected to form a matrix $\tilde{U}_2$. It should be understood that $\tilde{U}_1$ and $\tilde{U}_2$ include most energy of the channel. It should be noted that $P_1$ and $P_2$ may be selected by the terminal device, or may be selected by the terminal device within a specified optional range.

The terminal device may perform approximation on the spatial-frequency joint channel h of the channel H by using the superposition coefficient, the spatial domain base, the frequency domain base, and the like. It should be understood that $$h = \begin{bmatrix} h_1 \\ h_2 \end{bmatrix}.$$

For whether channel polarizations correspond to a same spatial-frequency joint base, the terminal device may obtain different approximations of the spatial-frequency joint channel h of the channel H by using the superposition coefficient, the spatial domain base, the frequency domain base, and the like, and designed first codebooks are also different.

It should be noted that an example in which covariance matrix statistics are performed based on a polarization is used in the foregoing descriptions. This is not limited in this embodiment of this application. For example, covariance matrix statistics may be not performed based on the polarization. To be specific, spatial-frequency joint covariance matrix statistics are performed on the channels corresponding to the two polarization directions, to obtain one R corresponding to dual polarizations. Therefore, based on R, the channel is approximated to a matrix formed by the superposition coefficient and the spatial-frequency joint base. Alternatively, covariance matrix statistics may be performed based on the polarization. However, after $R_1$ and $R_2$ in the two polarization directions are obtained, $R_1$ and $R_2$ may be averaged, and then the channel is approximated to a matrix formed by the superposition coefficient and the spatial-frequency joint base. The following uses the example in which covariance matrix statistics are performed based on the polarization.

Design solution 1: The first codebook is designed for a case in which two polarizations of a channel correspond to a same spatial-frequency joint base.

If two polarizations of the channel H correspond to a same spatial-frequency joint base, spatial-frequency joint covariance matrix statistics are performed on the spatial-frequency joint channel h of the channel H to obtain $R'_h = [\mathbb{E}\{h_1 h_1^H\} + \mathbb{E}\{h_2 h_2^H\}]/2$, and singular value decomposition (singular value decomposition, SVD) or eigen decomposition is performed on $R'_h$ to obtain a matrix U' formed by eigenvectors, where a dimension of U' is $M_1M_2N_{sb} \times M_1M_2N_{sb}$. Alternatively, spatial-frequency joint covariance matrix statistics are performed on the spatial-frequency joint channel h of the channel H, to obtain $R_h = \mathbb{E}\{hh^H\}$, and SVD or eigen decomposition is performed on $R_h$ to obtain a matrix U formed by eigenvectors, where a dimension of U is $2M_1M_2N_{sb} \times 2M_1M_2N_{sb}$.

For $R'_h = [\mathbb{E}\{h_1h_1^H\} + \mathbb{E}\{h_2h_2^H\}]/2$, a column vector including most energy of the channel is determined from U'. For example, U' is truncated, and J columns corresponding to J eigenvalues with large energy are selected to form a matrix U". A dimension of U" is $M_1M_2N_{sb} \times J$. In other words, U" includes most energy of the channel. It should be noted that the terminal device may determine a value of P, or may select a value of J from an optional range.

For $R_h = \mathbb{E}\{hh^H\}$, a column vector including most energy of the channel is determined from U. For example, U is truncated, and P columns corresponding to P eigenvalues with large energy are selected to form a matrix $\tilde{U}$. A dimension of $\tilde{U}$ is $2M_1M_2N_{sb} \times 2P$. In other words, $\tilde{U}$ includes most energy of the channel. It should be noted that the terminal device may determine a value of P, or may select a value of P from an optional range.

The following uses an example in which the column vector including most energy of the channel is determined from U, where for example, U is truncated, and P columns corresponding to P eigenvalues with large energy are selected to form the matrix $\tilde{U}$. The terminal device may perform approximation on $\tilde{U}$, to make $\tilde{U}$ approximate to the matrix formed by the superposition coefficient and the spatial-frequency joint base. For example, the terminal device may perform approximation on $\tilde{U}$ by using a DFT codebook. For example, $W_p$, $W_q$, $C_1$ are selected from the DFT codebook, so that $\tilde{U}$ meets a formula (13a):

$$\tilde{U} \approx (W_p \otimes W_q)C_1 = QC_1 \tag{13a}$$

It should be understood that $Q = W_p \otimes W_q$, $h \approx \tilde{U}C_2$, $C_2$ may be a projection of the instantaneous channel h on $QC_1$, and $C_2$ may meet a formula (14a):

$$C_2 = (QC_1)^H h \tag{14a}$$

In the formula (13a), a dimension of $\tilde{U}$ may be $2M_1M_2N_{sb} \times 2P$, and $W_p$ is used to quantize a difference between the two polarizations, and may be a DFT matrix, or $W_p$ meets $W_p = \text{daig}([1, e^{j\varphi}])$. When $\varphi=0$, $W_p=I_2$, and a dimension of $W_p$ is $2\times2$. $W_q$ is the spatial-frequency joint base. One frequency domain base corresponds to a plurality of spatial domain bases, or one spatial domain base corresponds to a plurality of frequency domain bases, or one frequency domain base corresponds to one spatial domain base. A dimension of $W_q$ is $N_{sb}M_1M_2 \times FB$, and FB is a quantity of spatial-frequency bases selected by the network device or the terminal device. $C_1$ represents a projection of $\tilde{U}$ on the matrix Q, may be considered as a spatial-frequency joint base correction matrix, and is used to correct Q to a statistical feature matrix $\tilde{U}$, that is, to make Q approximate to $\tilde{U}$. A dimension of $C_1$ is $2FB \times 2P$, and 2P is a quantity of columns of $\tilde{U}$. Because $W_p$ and $C_1$ are used to perform quantization and approximation on $\tilde{U}$, a quantity of rows of $C_1$ is greater than or equal to a quantity of columns of $C_1$. In the formula (14a), a dimension of h may be $2M_1M_2N_{sb} \times 1$, $N_{sb}$ is a quantity of frequency units, and a dimension of $C_2$ is $2P \times 1$.

As an alternative solution of the formula (13a), $\tilde{U}$ meets a formula (13b):

$$\tilde{U} \approx W_p \otimes (W_q C_1) \tag{13b}$$

It should be understood that $h \approx \tilde{U}C_2$ may exist, $C_2$ may be a projection of the instantaneous channel h on $\tilde{U}$, and $C_2$ may meet a formula (14b):

$$C_2 = (W_p \otimes (W_q C_1))^H h \tag{14b}$$

A difference from the formula (13a) lies in that, in the formula (13b), it may be considered that $W_q$ is first corrected by using $C_1$, and then polarization processing is performed. Same as those in the formula (13a), in the formula (13b) and the formula (14b), a dimension of h may be $2M_1M_2N_{sb} \times 1$, $N_{sb}$ is a quantity of frequency units, a dimension of $\tilde{U}$ may be $2M_1M_2N_{sb} \times 2P$, a dimension of $C_2$ is $2P \times 1$, $W_p$ is used to quantize the difference between the two polarizations, a dimension of $W_p$ is $2\times2$, $W_q$ is the spatial-frequency joint base, a dimension of $W_q$ is $N_{sb}M_1M_2 \times FB$, a dimension of $C_1$ is $FB \times P$, FB is a quantity of spatial-frequency bases selected by the network device or the terminal device, and 2P is a quantity of columns of $\tilde{U}$.

For example, FIG. 9 is a schematic diagram of matrix decomposition of the spatial-frequency joint channel h. In FIG. 9, one frequency domain base corresponds to a plurality of spatial domain bases, or one spatial domain base corresponds to a plurality of frequency domain bases, and $W_q$ may meet a formula (15):

$$W_q = W^*_f \otimes W_s \tag{15}$$

In the formula (15), a dimension of $W_q$ is $N_{sb}M_1M_2 \times FB$. FB is a quantity of spatial-frequency bases selected by the network device or the terminal device. $W_f$ is a frequency domain base, for example, may be a submatrix including some columns of an oversampled DFT matrix. A dimension of $W^*_f$ is $N_{sb} \times F$. F is a quantity of frequency domain bases selected by the network device or the terminal device, and F may be equal to $N_{sb}$. $W_s$ is a spatial domain base, for example, may be a submatrix including some columns of an oversampled DFT matrix, and a dimension of $W_s$ is $M_1M_2 \times B$. B is a quantity of spatial domain bases selected by the network device or the terminal device, and B may be equal to $M_1M_2$.

If the network device determines a channel state of the terminal device, the terminal device reports $W_p$, $W_q$, and $C_1$ in the formula (13a), and report $C_2$ in the formula (14a). After performing approximation on $\tilde{U}$, the terminal device may determine, based on the approximated $\tilde{U}$, namely, $QC_1$ and the instantaneous channel h, a codebook $C_2$ that is fed back. It should be noted that the terminal device may report some or all elements in $C_1$. For example, the terminal device may report a non-zero element or an element greater than a threshold in $C_1$. A quantity of elements in $C_1$ that are reported by the terminal device may alternatively be predefined or indicated in a protocol.

Based on the formula (13a), the structure of the first codebook W provided in embodiments of this application may meet a formula (16a):

$$W = (W_p \otimes W^*_f \otimes W_s)C_1C_2 \tag{16a}$$

Corresponding to those in the formula (13a), in the formula (16a), a dimension of $W^*_f$ is $N_{sb} \times F$, a dimension of $W_s$ is $M_1M_2 \times B$, a dimension of $C_1$ is $2FB \times 2P$, a dimension of $C_2$ is $2P \times 1$, and a dimension of $W_p$ is $2\times2$.

Based on the formula (13b), the structure of the first codebook W provided in embodiments of this application may meet a formula (16b):

$$W = (W_p \otimes ((W^*_f \otimes W_s)C_1))C_2 \tag{16b}$$

Corresponding to those in the formula (13b), in the formula (16b), a dimension of $W^*_f$ is $N_{sb} \times F$, a dimension of $W_s$ is $M_1M_2 \times B$, a dimension of $C_1$ is $FB \times 2P$, a dimension of $C_2$ is $2P \times 1$, and a dimension of $W_p$ is $2 \times 2$.

The terminal device may feed back $W_p$, $W_f$, $W_s$, $C_1$, and $C_2$ to the network device based on the first codebook shown in the formula (16a) or the formula (16b). Because the spatial-frequency joint base usually changes slowly, the terminal device may feed back $C_1$, $W_p$, $W_f$, and $W_s$ in a long periodicity. On the contrary, the superposition coefficient corresponding to the spatial-frequency joint base changes quickly. Therefore, the terminal device may feed back $C_2$ in a short periodicity or in an aperiodic manner, to reduce feedback overheads of the terminal device. It should be noted that, the long periodicity and the short periodicity herein are relative, and reporting periodicities of $W_p$, $W_f$, $W_s$, and $C_1$ may be the same or different. For example, $W_p$ represents an inter-polarization phase, and a time-varying rate of $W_p$ may be faster than those of $W_f$ and $W_s$. Therefore, a reporting periodicity of $W_p$ may be shorter than reporting periodicities of $W_f$ and $W_s$. It should be understood that because $W_p$, $W_f$, $W_s$, and $C_1$ are used to perform quantization and approximation on $U_{00}$, there is $2FB \geq 2P$ in the formula (16a), and there is $FB \geq P$ in the formula (16b).

It should be noted that, in this specification, an example in which a channel represented by a spatial domain-frequency domain matrix is represented by a spatial-frequency domain column vector is used. In some embodiments, the channel represented by the spatial domain-frequency domain matrix may alternatively be represented by a spatial-frequency domain row vector. This is not limited in embodiments of this application. If the channel represented by the spatial domain-frequency domain matrix is represented by the spatial-frequency domain row vector, adaptability of the structure of the first codebook accordingly changes. For example, the formula (15) may be adaptively changed to $W_q = W^*_s \otimes W_f$, the formula (16a) may be adaptively changed to $W = (W_p \otimes W^*_s \otimes W_f)C_1C_2$, and the formula (16b) may be adaptively changed to $W = (W_p \otimes ((W^*_s \otimes W_f)C_1))C_2$.

Figures 10, 11:
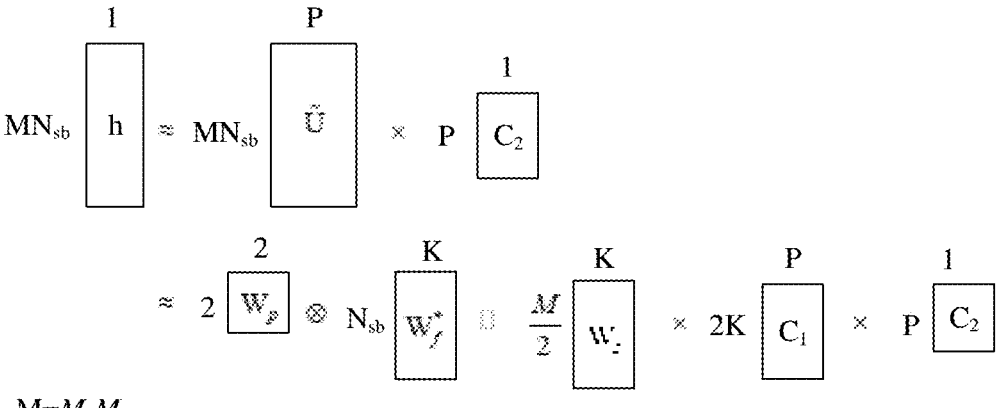
FIG. 10 is another schematic diagram of matrix decomposition of a spatial-frequency joint channel h according to an embodiment of this application.
FIG. 11 is a schematic diagram of decomposition of a downlink channel according to an embodiment of this application.

In an alternative solution, FIG. 10 is another schematic diagram of matrix decomposition of the spatial-frequency joint channel h. A difference from FIG. 9 lies in that, in FIG. 10, one frequency domain base corresponds to one spatial domain base, and $W_q$ may meet a formula (17):

$$W_q = W^*_f \odot W_s \qquad (17)$$

Based on the formula (13a), $\tilde{U}$ may approximately meet a formula (18a):

$$\tilde{U} \approx (W_p \otimes (W^*_f \odot W_s))C_1 = QC_1 \qquad (18a)$$

Correspondingly, the structure of the first codebook W meets a formula (19a):

$$W \approx (W_p \otimes (W^*_f \odot W_s))C_1C_2 \qquad (19a)$$

Based on the formula (13b), $\tilde{U}$ may approximately meet a formula (18b):

$$\tilde{U} \approx W_p \otimes ((W^*_f \odot W_s)C_1) \qquad (18b)$$

Correspondingly, the structure of the first codebook W meets a formula (19a):

$$W \approx W_p \otimes ((W^*_f \odot W_s)C_1)C_2 \qquad (19b)$$

A difference from FIG. 9 lies in that $W_f$ is a frequency domain base, and may be, for example, a submatrix including some columns of an oversampled DFT matrix; and $W_s$ is a spatial domain base, and may be, for example, a submatrix including some columns of an oversampled DFT matrix. In the formula (19a), a dimension of $W^*_f$ is $N_{sb} \times F$, a dimension of $W_s$ is $M_1M_2 \times K$, and a dimension of $C_1$ is $2K \times 2P$. In the formula (19b), a dimension of $W^*_f$ is $N_{sb} \times F$, a dimension of $W_s$ is $M_1M_2 \times K$, and a dimension of $C_1$ is $K \times P$. It should be understood that because $W_p$, $W_f$, $W_s$, and $C_1$ are used to perform quantization and approximation on $\tilde{U}$, there is $2K \geq 2P$. Similarly, the terminal device may report $W_p$, $W_f$, $W_s$, and $C_1$ to the network device in a long periodicity, and report $C_1$ to the network device in a short periodicity. A difference lies in that, if the terminal device performs feedback according to the formula (19a), a dimension of $C_1$ that is fed back is $2K \geq 2P$; but if the terminal device performs feedback according to the formula (19b), a dimension of $C_1$ that is fed back is $K \times P$, and therefore feedback overheads are lower. It should be noted that the terminal device may report some or all elements in $C_1$. For example, the terminal device may report a non-zero element or an element greater than a threshold in $C_1$. A quantity of elements in $C_1$ that are reported by the terminal device may alternatively be predefined or indicated in a protocol.

Similarly, if the channel represented by the spatial domain-frequency domain matrix is represented by the spatial-frequency domain row vector, adaptability of the structure of the first codebook accordingly changes. For example, the formula (17a) may be adaptively changed to $W_q = W^*_s \odot W_f$, the formula (19a) may be adaptively changed to $W = (W_p \otimes (W^*_s \odot W_f))C_1C_2$, and the formula (19b) may be adaptively changed to $W = W_p \otimes ((W^*_s \odot W_f)C_1)C_2$.

In embodiments of this application, compression feedback is performed on the channel in joint spatial-frequency domain. Compared with that compression feedback is performed on the channel in spatial domain and frequency domain separately, this manner can be used to fully explore sparseness of the channel, thereby improving accuracy of channel state information and improving system performance. In addition, base information (the spatial domain base and/or the frequency domain base) is fed back in a long periodicity and the superposition coefficient is fed back in a short periodicity, so that feedback overheads of the terminal device are reduced.

In the design solution 1, an example in which the two polarizations have a same spatial-frequency base is used. It should be understood that if the two polarizations correspond to different spatial-frequency bases, quantization feedback may be separately performed on the channel corresponding to each polarization, and with reference to differential feedback superposition coefficients, spatial domain bases, and frequency domain bases of different polarizations, CSI precision may be improved. The following uses a dual-polarized channel as an example to describe how the terminal device feeds back the CSI.

Design solution 2: The first codebook is designed for a case in which two polarizations of a channel correspond to different spatial-frequency bases.

A difference between this design solution and the design solution 1 lies in that the terminal device may separately perform, by using a DFT codebook, approximation on matrices $\tilde{U}_1$ and $\tilde{U}_2$ including statistical eigenvectors. $\tilde{U}_1$ is used as an example. To be specific, $W_{f,1}$, $W_{s,1}$, and $C_{1,1}$ are found, so that $\tilde{U}_1 \approx (W^*_{f,1} \otimes W_{s,1})C_{1,1} = Q_1C_{1,1}$. $W_{f,1}$ and $W_{s,1}$ are submatrices formed by some columns of an oversampled DFT matrix, and respectively represent a frequency domain base and a spatial domain base. $C_{1,1}$ represents a projection of $\tilde{U}_1$ on $Q_1$, and $Q_1 = W^*_{f,1} \otimes W_{s,1}$. An approximation of $\tilde{U}_2$ is similar to an approximation of $\tilde{U}_1$, that is $\tilde{U}_2 \approx (W^*_{f,2} \otimes W_{s,2})C_{1,2} = Q_2C_{1,2}$. $W_{f,2}$ and $W_{s,2}$ are submatrices formed by some columns of an oversampled DFT matrix, and respectively represent a frequency domain base and a spatial domain base. $C_{1,2}$ represents a projection of $\tilde{U}_2$ on $Q_2$, and $Q_2 = W^*_{f,2} \otimes W_{s,2}$. Details are not described herein again.

It should be understood that, if quantities of antenna ports in a horizontal direction and a vertical direction are respectively $M_1$ and $M_2$, a dimension of h is $2M_1M_2N_{sb}\times1$, and $N_{sb}$ is a quantity of subbands. It is assumed that first $M_1\times M_2$ rows correspond to one polarized channel, and last $M_1\times M_2$ rows correspond to one polarized channel. In this case, a dimension of $h_1$ is $M_1M_2N_{sb}\times1$, and a dimension of $h_2$ is $M_1M_2N_{sb}\times1$. Similarly, a dimension of $\tilde{U}_1$ is $M_1M_2N_{sb}\times P_1$, a dimension of $\tilde{U}_2$ is $M_1M_2N_{sb}\times P_2$. $P_1$ is a quantity of superposition coefficients corresponding to a first polarization direction, $P_2$ is a quantity of superposition coefficients corresponding to a second polarization direction, and P1 and P2 may be the same or different. A dimension of $W_{f,1}$ is $N_{sb}\times F_1$, and $F_1$ is a quantity of frequency domain bases selected by the network device or the terminal device in the first polarization direction. A dimension of $W_{f,2}$ is $N_{sb}\times F_2$, and $F_2$ is a quantity of frequency domain bases selected by the network device or the terminal device in the second polarization direction. $F_1$ may be equal to $F_2$, or $F_1$ is not equal to $F_2$. A dimension of $W_{s,1}$ is $M_1M_2\times B_1$, and $B_1$ is a quantity of spatial domain bases selected by the network device or the terminal device in the first polarization direction. A dimension of $W_{s,2}$ is $M_1M_2\times B_2$, and $B_2$ is a quantity of spatial domain bases selected by the network device or the terminal device in the second polarization direction. $B_1$ and $B_2$ are the same or different. A dimension of $C_{1,1}$ is $F_1B_1\times P_1$, and $F_1B_1$ is a quantity of spatial-frequency bases selected by the network device or the terminal device in the first polarization direction. A dimension of $C_{1,2}$ is $F_2B_2\times P_2$, and $F_2B_2$ is a quantity of spatial-frequency bases selected by the network device or the terminal device in the second polarization direction. Details are not described herein again.

In an example, the approximation solution of the spatial-frequency joint channel h shown in FIG. 9 is used. A structure of a codebook $W_1$ corresponding to the first polarization direction may meet a formula (20), and a codebook $W_2$ corresponding to the second polarization direction may meet a formula (21):

$$W_1=(W^*_{f,1}\otimes W_{s,1})C_{1,1}C_{2,1} \qquad (20);\text{ and}$$

$$W_2=(W_{f,2}\otimes W_{s,2})C_{1,2}C_{2,2} \qquad (21)$$

It should be understood that a dimension of $W_1$ is $M_1M_2\times N_{sb}$, a dimension of $W_2$ is $M_1M_2\times N_{sb}$, a dimension of $W_{f,1}$ is $N_{sb}\times F_1$, and a dimension of $W_{f,2}$ is $N_{sb}\times F_2$. $F_1$ is the quantity of frequency domain bases selected by the network device or the terminal device in the first polarization direction, $F_2$ is the quantity of frequency domain bases selected by the network device or the terminal device in the second polarization direction, and $F_1$ and $F_2$ are the same or different. A dimension of $W_{s,1}$ is $M_1M_2\times B_1$, and $B_1$ is the quantity of spatial domain bases selected by the network device or the terminal device in the first polarization direction. A dimension of $W_{s,2}$ is $M_1M_2\times B_2$, and $B_2$ is the quantity of spatial domain bases selected by the network device or the terminal device in the second polarization direction. $B_1$ and $B_2$ are the same or different. A dimension of $C_{1,1}$ is $F_1B_1\times P_1$, and $F_1B_1$ is the quantity of spatial-frequency bases selected by the network device or the terminal device in the first polarization direction. A dimension of $C_{1,2}$ is $F_2B_2\times P_2$, and $F_2B_2$ is the quantity of spatial-frequency bases selected by the network device or the terminal device in the second polarization direction. A dimension of $C_{2,1}$ is $P_1\times1$, a dimension of $C_{2,2}$ is $P_2\times1$, $P_1$ is the quantity of superposition coefficients corresponding to the first polarization direction, and $P_2$ is the quantity of superposition coefficients corresponding to the second polarization direction. Details are not described herein again. It should be noted that in FIG. 9, $B_1=B_2=B$, $F_1=F_2=F$, and $P_1=P_2=P$ are used as an example.

Further, the terminal device calculates, based on the instantaneous channel $h_1$ and an obtained long-periodicity codebook, namely, $Q_1C_{1,1}$, a short-periodicity codebook $C_{2,1}$ that is fed back; and calculates, based on the instantaneous channel $h_2$ and an obtained long-periodicity codebook, namely, $Q_2C_{1,2}$, a short-periodicity codebook $C_{2,2}$ that is fed back. $h_1$ is used as an example. A matrix formed by superposition coefficients of $h_1$ on a corresponding long-periodicity base is $C_{2,1}$, and $C_{2,1}=(Q_1C_{1,1})^H h_1$ may be obtained by using a projection of $h_1$ on $Q_1C_{1,1}$, or may be obtained through calculation in another form. An instantaneous superposition coefficient $C_{2,2}$ corresponding to $h_2$ is obtained through calculation in the same manner. Details are not described again. The terminal device feeds back $C_{2,1}$ and $C_{2,2}$ to the network device in a short periodicity or in an aperiodic manner, to reconstruct the downlink channel.

In another example, the approximation solution of the spatial-frequency joint channel h shown in FIG. 10 is used. A structure of a codebook $W_1$ corresponding to the first polarization direction may meet a formula (22), and a codebook $W_2$ corresponding to the second polarization direction may meet a formula (23):

$$W_1=(W^*_{f,1}\odot W_{s,1})C_{1,1}C_{2,1} \qquad (22);\text{ and}$$

$$W_2=(W^*_{f,2}\odot W_{s,2})C_{1,2}C_{2,2} \qquad (23)$$

It should be understood that dimensions of $W_1$ and $W_2$ are $M_1M_2\times N_{sb}$. A dimension of $W_{f,1}$ is $N_{sb}\times K_1$, and $K_1$ is a quantity of spatial-frequency bases, and represents a valid dimension of a downlink spatial domain eigenspace. A dimension of $W_{f,2}$ is $N_{sb}\times K_2$, and $K_2$ is a quantity of spatial-frequency bases, and represents a valid dimension of a downlink spatial domain eigenspace. A dimension of $W_{s,1}$ is $M_1M_2\times K_1$, a dimension of $W_{s,2}$ is $M_1M_2\times K_2$, a dimension of $C_{1,1}$ is $K_1\times P_1$, and a dimension of $C_{1,2}$ is $K_2\times P_2$. $K_1$ and $K_2$ are the same or different. A dimension of $C_{2,1}$ is $P_1\times1$, and a dimension of $C_{2,2}$ is $P_2\times1$. $P_1$ is the quantity of superposition coefficients corresponding to the first polarization direction, $P_2$ is the quantity of superposition coefficients corresponding to the second polarization direction, and $P_1$ and $P_2$ are the same or different. Details are not described herein again. It should be noted that in FIG. 10, $K_1=K_2=K$, and $P_1=P_2=P$ are used as an example.

In the design solution 2, quantization feedback is performed on the channel based on a polarization, and with reference to differential feedback superposition coefficients, spatial domain bases, and frequency domain bases of different polarizations, CSI precision may be improved. In addition, there may be a correlation between different polarizations, and feedback may be further performed based on differentials between the different polarizations. For example, for feedback of $W_2$, only differentials between $W_2$ and $W_1$ may be fed back, thereby further reducing feedback overheads.

Similarly, if the channel represented by the spatial domain-frequency domain matrix is represented by the spatial-frequency domain row vector, adaptability of the structure of the first codebook accordingly changes. For example, the formula (20) may be adaptively changed to $W_1=(W^*_{s,1}\otimes W_{f,1})C_{1,1}C_{2,1}$, and the formula (21) may be adaptively changed to $W_2=(W^*_{s,2}\otimes W_{f,2})C_{1,2}C_{2,2}$.

The formula (22) may be adaptively changed to $W_1=(W^*_{s,1}\odot W_{f,1})C_{1,1}C_{2,1}$, and the formula (23) may be adaptively changed to $W_2=(W^*_{s,2}\odot W_{f,2})C_{1,2}C_{2,2}$.

It should be noted that, in the design solution 1 and the design solution 2, an example in which the terminal device uses a DFT matrix as a codebook set is used. In other words, an example in which $W_p$, $W_q$, $W_f$, $W_s$, $W_{f,1}$, $W_{f,2}$, $W_{s,1}$, $W_{s,2}$, and the like are all DFT matrices (oversampled DFT matrices) is used. In a possible implementation, $W_p$, $W_q$, $W_f$, $W_s$, $W_{f,1}$, $W_{f,2}$, $W_{s,1}$, and $W_{s,2}$ may alternatively be other matrices that may be agreed on in advance. Whether $W_p$, $W_q$, $W_f$, $W_s$, $W_{f,1}$, $W_{f,2}$, $W_{s,1}$, and $W_{s,2}$ are DFT matrices is not limited in embodiments of this application. When $W_1$ does not meet $W_1=W_p \otimes W_q$, $W_1$ may be obtained by using a codebook or in another manner.

Design solution 3: The first codebook is designed for a case in which the CSI may be fed back based on reciprocity between angles and delays of uplink and downlink physical channels.

It should be understood that, for the reciprocity between the angles and the delays of the uplink and downlink physical channels, the network device may obtain a spatial-frequency base $U_{ul}$ by using the uplink channel, and the network device may send a pilot of a loading angle, a delay, or the spatial-frequency base. After measuring the pilot, the terminal device may calculate a projection of a downlink channel $h_{dl}$ on $U_{ul}$, namely, a full-band superposition coefficient, and feed back the coefficient to the network device.

For ease of understanding, FIG. 11 is a schematic diagram of decomposition of a downlink channel.

As shown in FIG. 11, it is assumed that the downlink channel $h_{dl}$ is a downlink channel on which no precoding is loaded on a CSI port. In this case, $h_{dl}$ may meet a formula (24):

$$h_{dl} \approx U_{ul}C_1C_2 \qquad (24)$$

In the formula (24), a dimension of $h_{dl}$ is $2M_1M_2N_{sb} \times 1$, $M_1$ is a quantity of horizontal antenna ports of the network device, $M_2$ is a quantity of vertical antenna ports of the network device, and $N_{sb}$ is a quantity of frequency units. A dimension of $U_{ul}$ is $2M_1M_2N_{sb} \times Y_0$, $Y_0$ is a quantity of CSI-RS ports sent in the two polarization directions. A dimension of $C_1$ is $Y_0 \times P_0$, and $P_0$ is a quantity of CSI-RS ports selected from the CSI-RS ports sent in the two polarization directions. A dimension of $C_2$ is $P_0 \times 1$. It should be understood that $Y_0$ is greater than or equal to $P_0$. It may be considered that the base $U_{ul}$ calculated by using the uplink channel is corrected by using $C_1$, so that $U_{ul}C_1$ is closer to an eigenspace of the downlink channel. The terminal device only reports $C_1$ and $C_2$ according to the formula (24).

The terminal device calculates the projection of the downlink channel $h_{dl}$ on $U_{ul}$, namely, the full-band superposition coefficient c. It may be assumed that $c=\tilde{U}_{ul}{}^H h_{dl}$, and the terminal device may calculate $C_1$ and $C_2$ based on c. Then, the terminal device may feed back $C_1$ to the network device in a long periodicity, and feed back $C_2$ to the network device in a short periodicity.

It should be noted that in embodiments of this application, because information about $U_{ul}$ is not sent to the terminal device, to ensure that the network device can correctly reconstruct the downlink channel, a feedback periodicity of $C_1$ matches an update periodicity of $U_{ul}$. In other words, a case in which $U_{ul}$ is updated but $C_1$ is not fed back should be avoided. Definitely, to avoid that the feedback periodicity of $C_1$ does not match the update periodicity of $U_{ul}$, $U_{ul}$ may also be sent to the terminal device. The terminal device may reconstruct, based on the received $U_{ul}$, channel information that is not loaded with a beamformed (beamformed) weight, and then calculate $C_1$ and $C_2$. In this way, the feedback periodicity of $C_1$ is irrelevant to the update periodicity of $U_{ul}$.

Based on the formula (24), a possible first codebook is provided, and the first codebook may meet a formula (25):

$$W=W_1C_1C_2 \qquad (25)$$

W is the first codebook, $W_1$ is a port selection matrix, and only one element in each column of $W_1$ is 1, and remaining elements are 0. For example, a dimension of $W_1$ is $2T \times Y_0$. 2T is a positive integer greater than or equal to 2, and represents a quantity of CSI-RS ports in the two polarization directions. $Y_0$ is a positive integer greater than or equal to 1, and represents a quantity of selected CSI-RS ports. $C_1$ is used to correct $W_1$, a dimension of $C_1$ is $Y_0 \times P_0$, $C_2$ is a superposition coefficient matrix, a dimension of $C_2$ is $P_0 \times 1$, and $P_0$ is a sum of quantities of superposition coefficients in the two polarization directions. It should be noted that the dimension of $W_1$ being $2T \times y_0$ indicates that the network device separately sends T CSI-RS ports in the two polarization directions. In some embodiments, the network device may send $T_1$ CSI-RS ports in one polarization direction, and may send $T_2$ CSI-RS ports in the other polarization direction. In other words, the dimension of $W_1$ is $(T_1+T_2) \times Y_0$, the dimension of $C_1$ is $Y_0 \times P_0$, and the dimension of $C_2$ is $P_0 \times 1$. Similarly, the network device may select different quantities of CSI-RS ports in the two polarization directions. To be specific, the dimension of $W_1$ is $(T_1+T_2) \times (Y_1+Y_2)$, the dimension of $C_1$ is $(Y_1+Y_2) \times P_0$, and the dimension of $C_2$ is $P_0 \times 1$.

It should be understood that, when the two polarizations of the channel correspond to different spatial-frequency joint bases, a structure of the codebook $W_1$ corresponding to the first polarization direction may meet a formula (26), and the codebook $W_2$ corresponding to the second polarization direction may meet a formula (27):

$$W_1=(W_{1,1})C_{1,1}C_{2,1} \qquad (26); \text{ and}$$

$$W_2=(=W_{1,2})C_{1,2}C_{2,2} \qquad (27)$$

The network device separately sends T CSI-RS ports in the two polarization directions, and dimensions of $W_1$ and $W_2$ are $T \times 1$. If the network device may send $T_1$ CSI-RS ports in one polarization direction, and may send $T_2$ CSI-RS ports in the other polarization direction, a dimension of $W_1$ is $T_1 \times 1$, and a dimension of $W_2$ is $T_2 \times 1$. If the quantities of CSI-RS ports selected by the network device in the two polarization directions are respectively $Y_1$ and $Y_2$, a dimension of $W_{1,1}$ is $T_1 \times Y_1$, and a dimension of $W_{1,2}$ is $T_2 \times Y_2$. $Y_1$ and $Y_2$ are positive integers greater than or equal to 1, and $Y_1$ and $Y_2$ are the same or different. A dimension of $C_{1,1}$ is $Y_1 \times P_1$, and a dimension of $C_{1,2}$ is $Y_2 \times P_2$. $P_1$ is the quantity of superposition coefficients corresponding to the first polarization direction, $P_2$ is the quantity of superposition coefficients corresponding to the second polarization direction, and $P_1$ and $P_2$ are the same or different. A dimension of $C_{2,1}$ is $P_1 \times 1$, and a dimension of $C_{2,2}$ is $P_2 \times 1$.

The terminal device may feed back $C_1$ and $C_2$ to the network device based on the first codebook described in the formula (25). The network device may obtain $U_{ul}$ by using the uplink channel, and reconstruct the downlink channel based on $C_1$ and $C_2$, to further determine the channel state of the terminal device. Based on the codebooks shown in the formula (26) and the formula (27), quantization feedback may be performed on the channel based on the polarization, and with reference to differential feedback superposition coefficients and spatial-frequency joint bases of different polarizations, CSI precision may be improved. In addition, there may be a correlation between different polarizations, and feedback may be further performed based on differentials between the different polarizations. For example, for feedback of $W_2$, only differentials between $W_2$ and $W_1$ may be fed back, thereby further reducing feedback overheads.

Based on various design solutions of the first codebook, this application provides a CSI feedback method. The method is for various first codebooks designed based on a case in which a channel is sparsely represented based on a joint spatial-frequency domain. In the following description process, an example in which the method is applied to the network architecture shown in FIG. 1 is used. In addition, the method is described from a perspective of interaction between two communication apparatuses, and may be performed by the two communication apparatuses. The two communication apparatuses are, for example, a first communication apparatus and a second communication apparatus. The first communication apparatus may be a network device or a communication apparatus that can support a network device in implementing a function required in the method. Alternatively, the first communication apparatus may be a terminal device or a communication apparatus that can support a terminal device in implementing a function required in the method. Certainly, the first communication apparatus may alternatively be another communication apparatus, for example, a chip system. Similarly, the second communication apparatus may be a network device or a communication apparatus that can support a network device in implementing a function required in the method. Alternatively, the second communication apparatus may be a terminal device or a communication apparatus that can support a terminal device in implementing a function required in the method. Certainly, the second communication apparatus may alternatively be another communication apparatus, for example, a chip system. In addition, implementations of both the first communication apparatus and the second communication apparatus are not limited. For example, the first communication apparatus may be a network device, and the second communication apparatus is a terminal device; or both the first communication apparatus and the second communication apparatus are terminal devices; or the first communication apparatus is a network device, and the second communication apparatus is a communication apparatus that can support a terminal device in implementing a function required in the method.

For ease of description, the following uses an example in which the method is performed by a network device and a terminal, namely, an example in which the first communication apparatus is a terminal device and the second communication apparatus is a network device. For example, the terminal device in the following may be any one of the six terminal devices in FIG. 1, and the network device in the following may be the network device in FIG. 1. It should be noted that this embodiment of this application only uses an example in which the network device and the terminal device are used for execution, but is not limited to this scenario.

Figures 12, 13:
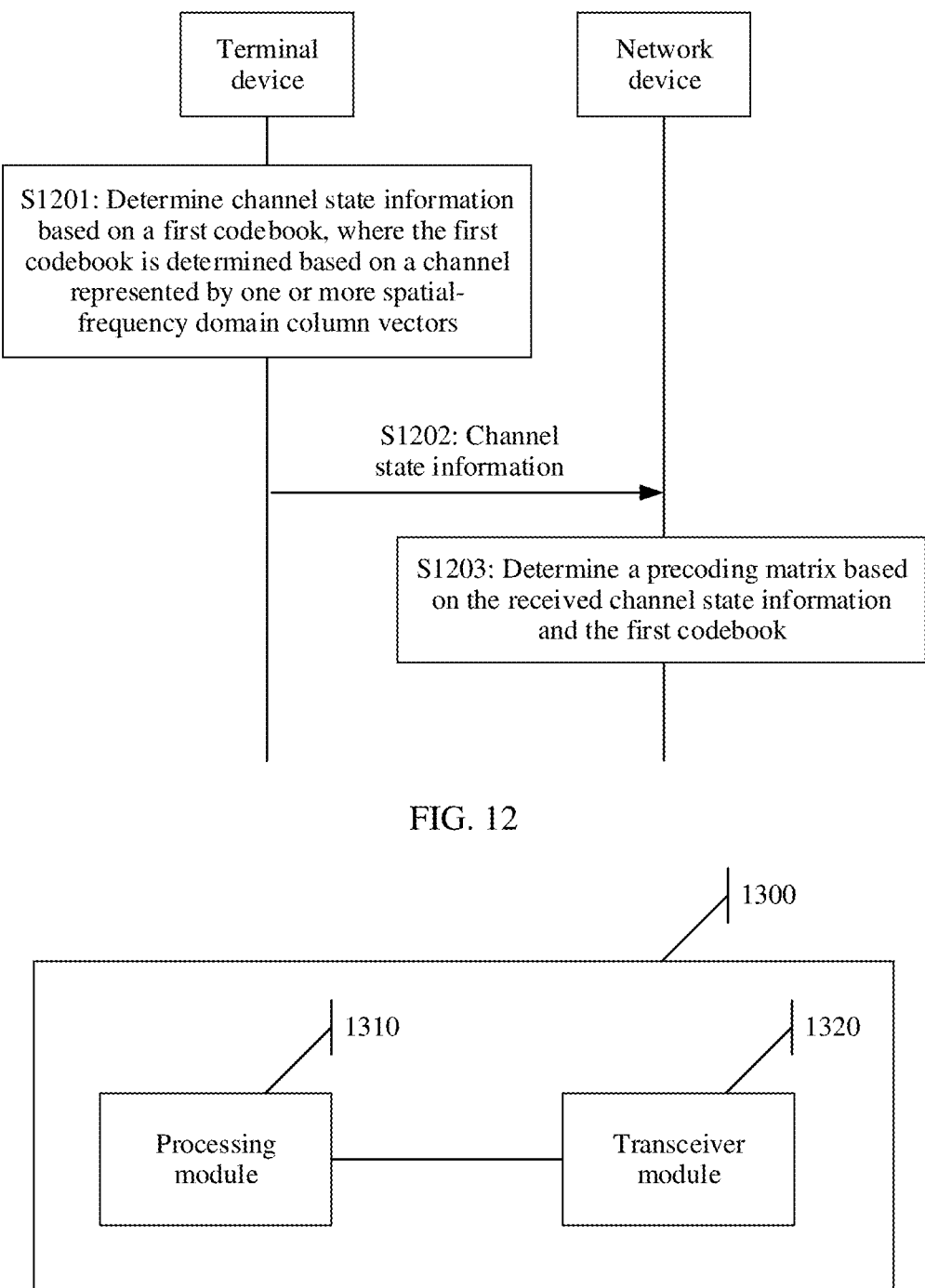
FIG. 12 is a schematic flowchart of a CSI feedback method according to an embodiment of this application.
FIG. 13 is a schematic diagram of a structure of a communication apparatus according to an embodiment of this application.

FIG. 12 is a schematic flowchart of a CSI feedback method according to an embodiment of this application. A procedure of the CSI feedback method provided in this embodiment of this application includes the following steps.

S1201: The terminal device determines channel state information based on a first codebook, where the first codebook is determined based on a channel represented by one or more spatial-frequency domain column vectors.

S1202: The terminal device sends the channel state information to the network device, and correspondingly, the network device receives the channel state information from the terminal device.

S1203: The network device determines a precoding matrix based on the received channel state information and the first codebook.

In this embodiment of this application, the first codebook is determined based on the channel represented by the one or more spatial-frequency domain column vectors. For example, for a terminal device that uses a single receive antenna, the first codebook may be determined based on the channel shown in the formula (2). The determined first codebook may include various first codebooks in the design solution 1, the design solution 2, and the design solution 3. For details, refer to descriptions in the foregoing embodiments. Details are not described herein again.

After determining the channel state information based on the first codebook, the terminal device may send the determined channel state information to the network device. The network device receives the channel state information, and may determine a channel state based on the received channel state information and the first codebook. Certainly, the network device may alternatively determine more other information, for example, the precoding matrix, based on the received channel state information and the first codebook.

In the foregoing embodiments provided in this application, the method provided in embodiments of this application is described from perspectives of the terminal device, the network device, and interaction between the terminal device and the network device. To implement functions in the method provided in embodiments of this application, the terminal and the base station each may include a hardware structure and/or a software module, and implement the functions in a form of the hardware structure, the software module, or the hardware structure and the software module.

The following describes, with reference to the accompanying drawings, a communication apparatus configured to implement the method in embodiments of this application. Therefore, all the foregoing content may be used in the following embodiments. Repeated content is not described again.

FIG. 13 is a schematic diagram of a structure of a communication apparatus. The communication apparatus may correspondingly implement functions or steps implemented by the terminal device or the network device in the method embodiments.

The communication apparatus may include a processing module 1310 and a transceiver module 1320. Optionally, the communication apparatus may further include a storage unit. The storage unit may be configured to store instructions (code or a program) and/or data. The processing module 1310 and the transceiver module 1320 may be coupled to the storage unit. For example, the processing module 1310 may read the instructions (the code or the program) and/or the data in the storage unit, to implement a corresponding method. The modules may be disposed independently, or may be partially or totally integrated.

In some possible implementations, the communication apparatus 1300 can correspondingly implement behavior and functions of the terminal device in the method embodiments. For example, the communication apparatus 1300 may be a terminal device, or may be a component (for example, a chip or a circuit) used in a terminal device. The transceiver module 1320 may be configured to perform all receiving or sending operations performed by the terminal device in the embodiment shown in FIG. 12, for example, S1202 in the embodiment shown in FIG. 12, and/or configured to support another process of the technology described in this specification. The processing module 1310 is configured to perform all operations, other than the sending and receiving operations, performed by the terminal device in the embodiment shown in FIG. 12, for example, S1201 in the embodiment shown in FIG. 12, and/or configured to support another process of the technology described in this specification.

In some embodiments, the processing module 1310 is configured to determine channel state information based on a first codebook, where the first codebook is determined based on a channel represented by one or more spatial-frequency domain column vectors, and the one or more spatial-frequency domain column vectors indicate a channel in joint spatial-frequency domain; and the transceiver module 1320 is configured to send the channel state information.

In a possible design, if two polarization directions of the channel correspond to a same spatial-frequency base, the first codebook may meet the following formula:

$$W = W_1 C_1 C_2$$

The first codebook is W; $W_1$ is a spatial-frequency joint base matrix; $C_1$ is a spatial-frequency joint base correction matrix, and is used to make $W_1$ approximate to W; and $C_2$ is a superposition coefficient matrix corresponding to the spatial-frequency joint base matrix, and indicates weights of one or more spatial-frequency joint bases in $W_1 C_1$ during weighted summation.

In a possible implementation, $W_1 = W_p \otimes W_q$, $W_p$ represents a phase difference between antenna polarization components, $W_q$ is a spatial-frequency joint base matrix, and each column vector in $W_q$ corresponds to one spatial-frequency joint base.

In a possible design, two polarization directions of the channel correspond to a same spatial-frequency base, and the first codebook meets the following formula:

$$W = (W_p \otimes (W_q C_1)) C_2$$

The first codebook is W; $W_p$ represents a phase difference between antenna polarization components; $W_q$ is a spatial-frequency joint base matrix; each column vector in $W_q$ corresponds to one spatial-frequency joint base; $C_1$ is a spatial-frequency joint base correction matrix, and is used to make $W_q$ approximate to W; and $C_2$ is a superposition coefficient matrix corresponding to the spatial-frequency joint base matrix, and indicates weights of one or more spatial-frequency joint bases in $W_q C_1$ during weighted summation. In this solution, the spatial-frequency joint base matrix is first corrected by using $C_1$, and then polarization processing is performed on a corrected spatial-frequency joint base, so that a dimension of $C_1$ can be reduced, and CSI feedback overheads are further reduced.

In a possible implementation, one frequency domain base in the spatial-frequency joint base matrix may correspond to a plurality of spatial domain bases, or one spatial domain base in the spatial-frequency joint base matrix may correspond to a plurality of frequency domain bases, and $W_q$ meets the following formula:

$W_q = W^*_f \otimes W_s$, where $W^*_f$ is a conjugate matrix of $W_f$, $W_f$ indicates a frequency domain base, and $W_s$ indicates a spatial domain base.

In a possible implementation, one frequency domain base in the spatial-frequency joint base matrix corresponds to one spatial domain base, and $W_q$ meets the following formula:

$W_q = W^*_f \odot W_s$, where $W^*_f$ is a conjugate matrix of $W_f$, $W_f$ indicates a frequency domain base, and $W_s$ indicates a spatial domain base.

In a possible design, two polarization directions of the channel correspond to different spatial-frequency bases, and the first codebook includes a codebook corresponding to a first polarization direction and a codebook corresponding to a second polarization direction.

In a possible implementation, the codebook corresponding to the first polarization direction meets $W_2 = W_{q,1} C_{1,1} C_{2,1}$, and the codebook corresponding to the second polarization direction meets $W_3 = W_{q,2} C_{1,2} C_{2,2}$. $W_{q,1}$ is a spatial-frequency joint base matrix corresponding to the first polarization direction. $W_{q,2}$ is a spatial-frequency joint base matrix corresponding to the second polarization direction. $C_{1,1}$ is a correction matrix of $W_{q,1}$, and is used to make $W_{q,1}$ approximate to $W_2$. $C_{1,2}$ is a correction matrix of $W_{q,2}$, and is used to make $W_{q,2}$ approximate to $W_3$. $C_{2,1}$ is a superposition coefficient matrix corresponding to $W_{q,1} C_{1,1}$, and $C_{2,2}$ is a superposition coefficient matrix corresponding to $W_{q,2} C_{1,2}$.

In a possible implementation, one frequency domain base in the spatial-frequency joint base matrix may also correspond to a plurality of spatial domain bases, or one spatial domain base in the spatial-frequency joint base matrix may correspond to a plurality of frequency domain bases.

$W_{q,1}$ meets $W_{q,1} = W^*_{f,1} \otimes W_{s,1}$.

$W_{q,2}$ meets $W_{q,2} = W^*_{f,2} \otimes W_{s,2}$.

$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In a possible implementation, one frequency domain base in the spatial-frequency joint base matrix may alternatively correspond to one spatial domain base.

$W_{q,1}$ meets $W_{q,1} = W^*_{f,1} \odot W_{s,1}$.

$W_{q,2}$ meets $W_{q,2} = W^*_{f,2} \odot W_{s,2}$.

$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In a possible design, the first codebook may meet the following formula:

$$W = W_1 C_1 C_2$$

The first codebook is W; $W_1$ is a port selection matrix; $C_1$ is a port selection matrix correction matrix, and is used to make $W_1$ approximate to W; and $C_2$ is a superposition coefficient matrix corresponding to the port selection matrix, and indicates a weight of one or more ports in $W_1 C_1$ during weighted summation.

In a possible implementation, the channel state information fed back by the terminal device is channel state information of a downlink channel, and the channel state information includes some or all elements in $C_1$ and $C_2$.

It should be understood that, in this embodiment of this application, the processing module 1310 may be implemented as a processor or a processor-related circuit component, and the transceiver module 1320 may be implemented as a transceiver or a transceiver-related circuit component, or a communication interface.

In some possible implementations, the communication apparatus 1300 can correspondingly implement behavior and functions of the network device in the method embodiments. For example, the communication apparatus 1300 may be the network device, or may be a component (for example, a chip or a circuit) used in the network device. The transceiver module 1320 may be configured to perform all receiving or sending operations performed by the network device in the embodiment shown in FIG. 12, for example, S1202 in the embodiment shown in FIG. 12, and/or configured to support another process of the technology described in this specification. The processing module 1310 is configured to perform all operations, other than the sending and receiving operations, performed by the network device in the embodiment shown in FIG. 12, for example, S1203 in the embodiment shown in FIG. 12, and/or configured to support another process of the technology described in this specification.

In some embodiments, the transceiver module 1320 is configured to receive channel state information, where the channel state information is determined based on a first codebook, the first codebook is determined based on a channel represented by one or more spatial-frequency domain column vectors, and the one or more spatial-frequency domain column vectors indicate the channel in joint spatial-frequency domain; and the processing module 1310 is configured to determine a channel state based on the channel state information and the first codebook.

In a possible design, if two polarization directions of the channel correspond to a same spatial-frequency base, the first codebook may meet the following formula:

$$W=W_1C_1C_2$$

The first codebook is W; $W_1$ is a spatial-frequency joint base matrix; $C_1$ is a spatial-frequency joint base correction matrix, and is used to make $W_1$ approximate to W; and $C_2$ is a superposition coefficient matrix corresponding to the spatial-frequency joint base matrix, and indicates weights of one or more spatial-frequency joint bases in $W_1C_1$ during weighted summation.

In a possible implementation, $W_1=W_p\otimes W_q$, $W_p$ represents a phase difference between antenna polarization components, $W_q$ is a spatial-frequency joint base matrix, and each column vector in $W_q$ corresponds to one spatial-frequency joint base.

In a possible design, two polarization directions of the channel correspond to a same spatial-frequency base, and the first codebook meets the following formula:

$$W=(W_p\otimes(W_qC_1))C_2$$

The first codebook is W; $W_p$ represents a phase difference between antenna polarization components; $W_q$ is a spatial-frequency joint base matrix; each column vector in $W_q$ corresponds to one spatial-frequency joint base; $C_1$ is a spatial-frequency joint base correction matrix, and is used to make $W_q$ approximate to W; and $C_2$ is a superposition coefficient matrix corresponding to the spatial-frequency joint base matrix, and indicates weights of one or more spatial-frequency joint bases in $W_qC_1$ during weighted summation. In this solution, the spatial-frequency joint base matrix is first corrected by using $C_1$, and then polarization processing is performed on a corrected spatial-frequency joint base, so that a dimension of $C_1$ can be reduced, and CSI feedback overheads are further reduced.

In a possible implementation, one frequency domain base in the spatial-frequency joint base matrix may correspond to a plurality of spatial domain bases, or one spatial domain base in the spatial-frequency joint base matrix may correspond to a plurality of frequency domain bases, and $W_q$ meets the following formula:

$W_q=W^*_f\otimes W_s$, where $W^*_f$ is a conjugate matrix of $W_f$, $W_f$ indicates a frequency domain base, and $W_s$ indicates a spatial domain base.

In a possible implementation, one frequency domain base in the spatial-frequency joint base matrix corresponds to one spatial domain base, and $W_q$ meets the following formula:

$W_q=W^*_f\odot W_s$, where $W^*_f$ is a conjugate matrix of $W_f$, $W_f$ indicates a frequency domain base, and $W_s$ indicates a spatial domain base.

In a possible design, two polarization directions of the channel correspond to different spatial-frequency bases, and the first codebook includes a codebook corresponding to a first polarization direction and a codebook corresponding to a second polarization direction.

In a possible implementation, the codebook corresponding to the first polarization direction meets $W_2=W_{q,1}C_{1,1}C_{2,1}$, and the codebook corresponding to the second polarization direction meets $W_3=W_{q,2}C_{1,2}C_{2,2}$. $W_{q,1}$ is a spatial-frequency joint base matrix corresponding to the first polarization direction. $W_{q,2}$ is a spatial-frequency joint base matrix corresponding to the second polarization direction. $C_{1,1}$ is a correction matrix of $W_{q,1}$, and is used to make $W_{q,1}$ approximate to $W_2$. $C_{1,2}$ is a correction matrix of $W_{q,2}$, and is used to make $W_{q,2}$ approximate to $W_3$. $C_{2,1}$ is a superposition coefficient matrix corresponding to $W_{q,1}C_{1,1}$, and $C_{2,2}$ is a superposition coefficient matrix corresponding to $W_{q,2}C_{1,2}$.

In a possible implementation, one frequency domain base in the spatial-frequency joint base matrix may also correspond to a plurality of spatial domain bases, or one spatial domain base in the spatial-frequency joint base matrix may correspond to a plurality of frequency domain bases.

$W_{q,1}$ meets $W_{q,1}=W^*_{f,1}\otimes W_{s,1}$.
$W_{q,2}$ meets $W_{q,2}=W^*_{f,2}\otimes W_{s,2}$.
$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In a possible implementation, one frequency domain base in the spatial-frequency joint base matrix may alternatively correspond to one spatial domain base.

$W_{q,1}$ meets $W_{q,1}=W^*_{f,1}\odot W_{s,1}$.
$W_{q,2}$ meets $W_{q,2}=W^*_{f,2}\odot W_{s,2}$.
$W^*_{f,1}$ is a conjugate matrix of $W_{f,1}$, $W_{f,1}$ is a frequency domain base matrix corresponding to the first polarization direction, $W^*_{f,2}$ is a conjugate matrix of $W_{f,2}$, $W_{f,2}$ is a frequency domain base matrix corresponding to the second polarization direction, $W_{s,1}$ is a spatial domain base matrix corresponding to the first polarization direction, and $W_{s,2}$ is a spatial domain base matrix corresponding to the second polarization direction.

In a possible design, the first codebook may meet the following formula:

$$W=W_1C_1C_2$$

The first codebook is W; $W_1$ is a port selection matrix; $C_1$ is a port selection matrix correction matrix, and is used to make $W_1$ approximate to W; and $C_2$ is a superposition coefficient matrix corresponding to the port selection matrix, and indicates a weight of one or more ports in $W_1C_1$ during weighted summation.

In a possible implementation, the channel state information fed back by the terminal device is channel state information of a downlink channel, and the channel state information includes some or all elements in $C_1$ and $C_2$.

It should be understood that, in this embodiment of this application, the processing module 1310 may be implemented as a processor or a processor-related circuit component, and the transceiver module 1320 may be implemented as a transceiver or a transceiver-related circuit component, or a communication interface.

Figure 14:
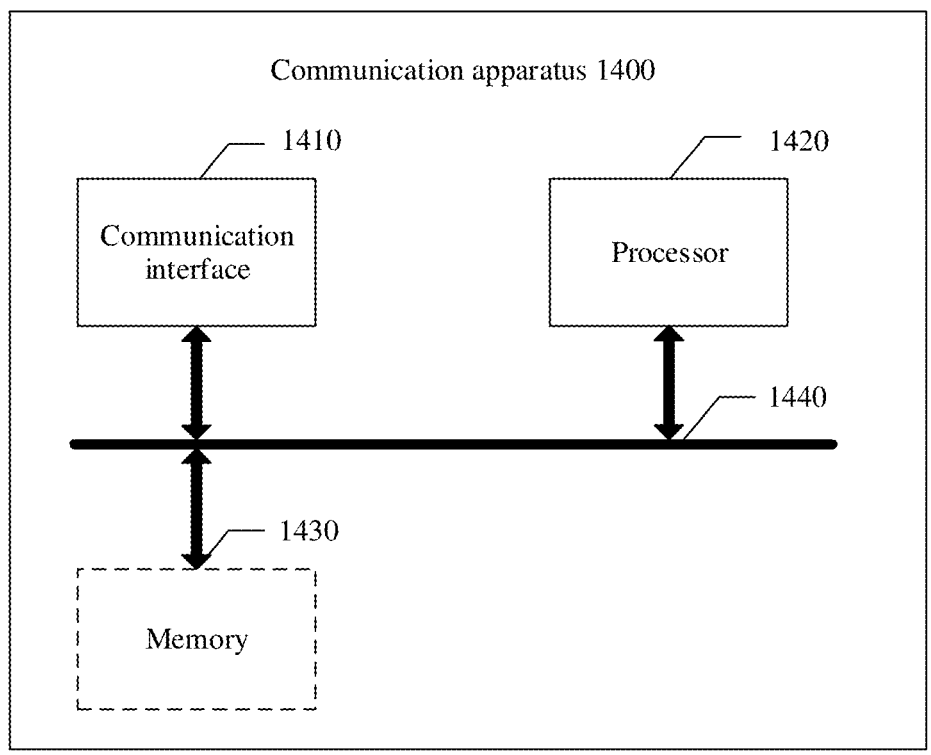
FIG. 14 is another schematic diagram of a structure of a communication apparatus according to an embodiment of this application.

FIG. 14 shows a communication apparatus 1400 according to an embodiment of this application. The communication apparatus 1400 may be a terminal device, and can implement a function of the terminal device in the method provided in embodiments of this application. Alternatively, the communication apparatus 1400 may be a network device, and can implement a function of the network device in the method provided in embodiments of this application. Alternatively, the communication apparatus 1400 may be an apparatus that can support a terminal device in implementing a corresponding function in the method provided in embodiments of this application, or may be an apparatus that can support a network device in implementing a corresponding function in the method provided in embodiments of this application. The communication apparatus 1400 may be a chip or a chip system. In this embodiment of this application, the chip system may include a chip, or may include a chip and another discrete device.

In a hardware implementation, the transceiver module 1320 may be a transceiver, and the transceiver is integrated in the communication apparatus 1400, to form a communication interface 1410.

The communication apparatus 1400 includes at least one processor 1420, configured to implement or support the communication apparatus 1400 in implementing the functions of the network device or the terminal device in the method provided in embodiments of this application. For details, refer to detailed descriptions in the method examples. Details are not described herein again.

The communication apparatus 1400 may further include at least one memory 1430, configured to store program instructions and/or data. The memory 1430 is coupled to the processor 1420. The coupling in this embodiment of this application may be an indirect coupling or a communication connection between apparatuses, units, or modules in an electrical form, a mechanical form, or another form, and is used for information exchange between the apparatuses, the units, or the modules. The processor 1420 may operate with the memory 1430. The processor 1420 may execute the program instructions and/or the data stored in the memory 1430, so that the communication apparatus 1400 implements a corresponding method. At least one of the at least one memory may be included in the processor.

The communication apparatus 1400 may further include the communication interface 1410, configured to communicate with another device through a transmission medium, so that an apparatus used in the communication apparatus 1400 can communicate with the another device. For example, when the communication apparatus is a terminal device, the another device is a network device; or when the communication apparatus is a network device, the another device is a terminal device. The processor 1420 may send and receive data through the communication interface 1410. The communication interface 1410 may be specifically a transceiver.

A specific connection medium between the communication interface 1410, the processor 1420, and the memory 1430 is not limited in this embodiment of this application. In this embodiment of this application, in FIG. 14, the memory 1430, the processor 1420, and the communication interface 1410 are connected through a bus 1440. The bus is represented by a bold line in FIG. 14. A connection manner between other components is merely an example for description, and is not limited thereto. The bus may be classified into an address bus, a data bus, a control bus, and the like. For ease of representation, only one bold line is used to represent the bus in FIG. 14, but this does not indicate that there is only one bus or only one type of bus.

In this embodiment of this application, the processor 1420 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory 1430 may be a non-volatile memory, for example, a hard disk drive (hard disk drive, HDD) or a solid-state drive (solid-state drive, SSD), or may be a volatile memory (volatile memory), for example, a random access memory (random access memory, RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store the program instructions and/or the data.

It should be noted that the communication apparatus in the foregoing embodiments may be a terminal, a circuit, a chip used in a terminal, or another combined device, component, or the like that has a function of a terminal. When the communication apparatus is a terminal, the transceiver module may be a transceiver, and may include an antenna, a radio frequency circuit, and the like. The processing module may be a processor, for example, a central processing module (central processing unit, CPU). When the communication apparatus is a component having a function of the terminal, the transceiver module may be a radio frequency unit, and the processing module may be a processor. When the communication apparatus is a chip or a chip system, the transceiver module may be an input/output interface of the chip or the chip system, and the processing module may be a processor of the chip or the chip system.

Figure 15:
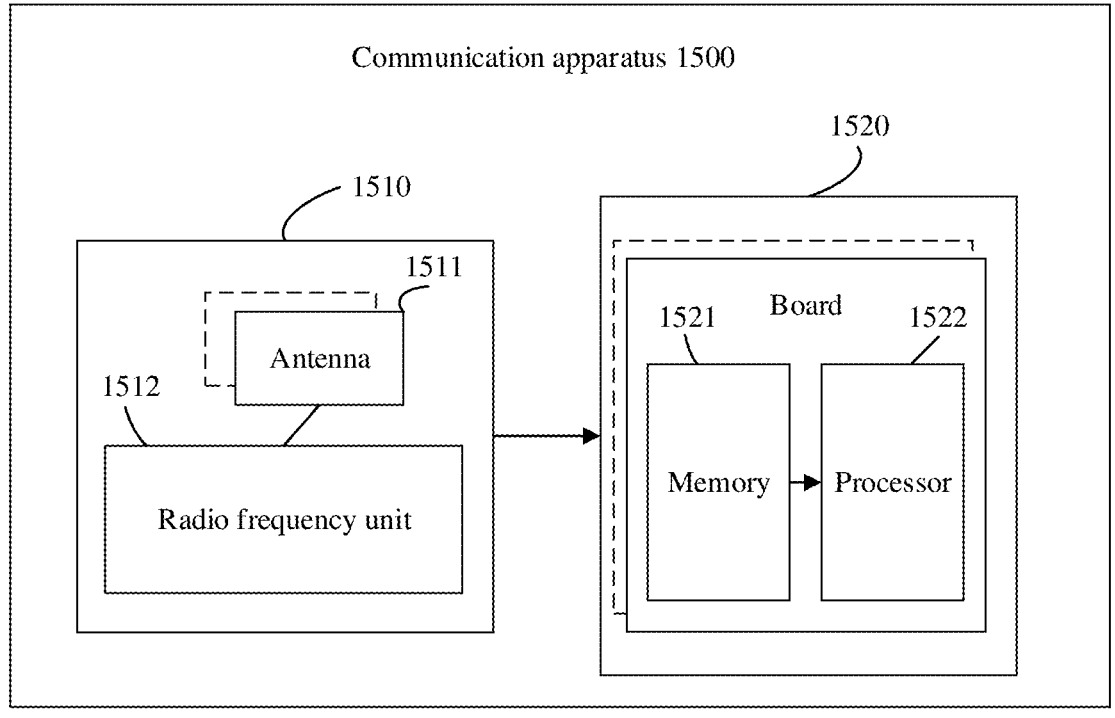
FIG. 15 is still another schematic diagram of a structure of a communication apparatus according to an embodiment of this application.

FIG. 15 is a schematic diagram of a simplified structure of a communication apparatus. For ease of understanding and illustration, in FIG. 15, an example in which the communication apparatus is a base station is used. The base station may be used in the system shown in FIG. 1, may be the network device in FIG. 1, and performs functions of the network device in the method embodiments.

The communication apparatus 1500 may include a transceiver 1510, a memory 1521, and a processor 1522. The transceiver 1510 may be used by the communication apparatus to perform communication, for example, configured to send or receive the indication information. The memory 1521 is coupled to the processor 1522, and may be configured to store a program and data that are used for implementing functions of the communication apparatus 1500. The processor 1522 is configured to support the communication apparatus 1500 in performing a corresponding function in the method, and the function may be implemented by invoking the program stored in the memory 1521.

Specifically, the transceiver 1510 may be a wireless transceiver, and may be configured to support the communication apparatus 1500 in sending and receiving signaling and/or data through a radio air interface. The transceiver 1510 may also be referred to as a transceiver unit or a communication unit. The transceiver 1510 may include one or more radio frequency units 1512 and one or more antennas 1511. The radio frequency unit 1512, for example, a remote radio unit (remote radio unit, RRU) or an active antenna unit (active antenna unit, AAU), may be specifically configured to transmit a radio frequency signal and perform conversion between a radio frequency signal and a baseband signal. The one or more antennas 1511 may be specifically configured to radiate and receive a radio frequency signal. Optionally, the transceiver 1510 may include only the radio frequency unit. In this case, the communication apparatus 1500 may include the transceiver 1510, the memory 1521, the processor 1522, and the antennas.

The memory 1521 and the processor 1522 may be integrated or may be independent of each other. As shown in FIG. 15, the memory 1521 and the processor 1522 may be integrated into a control unit 1520 of the communication apparatus 1500. For example, the control unit 1520 may include a baseband unit (baseband unit, BBU) of an LTE base station, and the baseband unit may also be referred to as a digital unit (digital unit, DU). Alternatively, the control unit 1520 may include a distributed unit (distribute unit, DU) and/or a centralized unit (centralized unit, CU) in a base station in 5G or a future radio access technology. The control unit 1510 may include one or more antenna panels. A plurality of antenna panels may jointly support a radio access network (for example, an LTE network) of a single access standard, or a plurality of antenna panels may separately support radio access networks (for example, an LTE network, a 5G network, and another network) of different access standards. The memory 1521 and the processor 1522 may serve one or more antenna panels. In other words, the memory 1521 and the processor 1522 may be separately disposed on each antenna panel. Alternatively, the plurality of antenna panels may share a same memory 1521 and a same processor 1522. In addition, circuitry may be disposed on each antenna panel. For example, the circuit may be configured to implement a coupling between the memory 1521 and the processor 1522. The transceiver 1510, the processor 1522, and the memory 1521 may be connected by using a bus (bus) structure and/or another connection medium.

Based on the structure shown in FIG. 15, when the communication apparatus 1500 sends data, the processor 1522 may perform baseband processing on to-be-sent data, and output a baseband signal to the radio frequency unit. The radio frequency unit performs radio frequency processing on the baseband signal, and then sends a radio frequency signal in a form of an electromagnetic wave through the antenna. When data is sent to the communication apparatus 1500, the radio frequency unit receives a radio frequency signal through the antenna, converts the radio frequency signal into a baseband signal, and outputs the baseband signal to the processor 1522. The processor 1522 converts the baseband signal into data, and processes the data.

Based on the structure shown in FIG. 15, the transceiver 1510 may be configured to perform the steps performed by the transceiver module 1320, and/or the processor 1522 may be configured to invoke instructions in the memory 1521, to perform the steps performed by the processing module 1310.

An embodiment of this application further provides a communication system. Specifically, the communication system includes a network device and a terminal device, or may include more network devices and more terminal devices. For example, the communication system includes a network device and a terminal device that are configured to implement related functions in FIG. 12.

The network device is separately configured to implement functions related to a network part in FIG. 12. The terminal is configured to implement the functions related to the terminal device in FIG. 12. For details, refer to the related descriptions in the method embodiments. Details are not described herein again.

An embodiment of this application further provides a computer-readable storage medium including instructions. When the instructions are run on a computer, the computer is enabled to perform the method performed by the network device in FIG. 12; or when the instructions are run on a computer, the computer is enabled to perform the method performed by the terminal device in FIG. 12.

An embodiment of this application further provides a computer program product. The computer program product includes instructions. When the instructions are run on a computer, the computer is enabled to perform the method performed by the network device in FIG. 12; or when the instructions are run on a computer, the computer is enabled to perform the method performed by the terminal device in FIG. 12.

An embodiment of this application provides a chip system. The chip system includes a processor, may further include a memory, and is configured to implement the functions of the network device or the terminal device in the method, or implement the functions of the network device and the terminal in the method. The chip system may include a chip, or may include a chip and another discrete device.

It should be understood that sequence numbers of the processes do not mean execution sequences in various embodiments of this application. The execution sequences of the processes are determined according to functions and internal logic of the processes, and should not be construed as any limitation on the implementation processes of embodiments of this application.

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel state information feedback method, comprising:

determining channel state information based on a first codebook, wherein the first codebook is determined based on a channel represented by one or more spatial-frequency domain column vectors, a length of each of the one or more spatial-frequency domain column vectors is determined based on a number of transmit antenna ports of a terminal, and the one or more spatial-frequency domain column vectors is usable to indicate the channel in joint spatial-frequency domain; and sending the channel state information, wherein two polarizations of the channel correspond to a same spatial-frequency base, and the first codebook meets the following formula:

$$W = (W_p \otimes (W_q C_1)) C_2, \text{ wherein}$$

the first codebook is W; $W_p$ represents a phase difference between antenna polarization components; $W_q$ is a spatial-frequency joint base matrix; one spatial-frequency joint base is correspondingly selected for each column vector in $W_q$; $C_1$ is a spatial-frequency joint base correction matrix, and is used to make $W_q$ approximate to W; and $C_2$ is a superposition coefficient matrix corresponding to the spatial-frequency joint base matrix, and indicates weights of one or more spatial-frequency joint bases in $W_q C_1$ during weighted summation.

2. The method according to claim 1, wherein the first codebook meets the following formula:

$$W = W_1 C_1 C_2, \text{ wherein}$$

the first codebook is W; $W_1$ is a spatial-frequency joint base matrix.

3. The method according to claim 2, wherein $W_1 = W_p \otimes W_q$.

4. The method according to claim 1, wherein one frequency domain base in the spatial-frequency joint base matrix corresponds to a plurality of spatial domain bases, or one spatial domain base in the spatial-frequency joint base matrix corresponds to a plurality of frequency domain bases, and $W_g$ meets the following formula:

$$W_q = W^*_f \otimes W_s, \text{ wherein } W^*_f \text{ is a conjugate matrix of } W_f, W_f \text{ indicates a frequency domain base, and } W_s \text{ indicates a spatial domain base.}$$

5. The method according to claim 1, wherein one frequency domain base in the spatial-frequency joint base matrix corresponds to one spatial domain base, and $W_q$ meets the following formula:

$$W_q = W^*_f \odot W_s, \text{ wherein } W^*_f \text{ is a conjugate matrix of } W_f, W_f \text{ indicates a frequency domain base, and } W_s \text{ indicates a spatial domain base.}$$

6. A communication apparatus, comprising:

at least one processor, and one or more memories coupled to the at least one processor and configured to store programming instructions for execution by the at least one processor to perform operations comprising:

determining channel state information based on a first codebook, wherein the first codebook is determined based on a channel represented by one or more spatial-frequency domain column vectors, a length of each of the one or more spatial-frequency domain column vectors is determined based on a number of transmit antenna ports of a terminal, and the one or more spatial-frequency domain column vectors is usable to indicate a channel in joint spatial-frequency domain; and sending the channel state information, wherein two polarizations of the channel correspond to a same spatial-frequency base, and the first codebook meets the following formula:

$$W = (W_p \otimes (W_q C_1)) C_2, \text{ wherein}$$

the first codebook is W; $W_p$ represents a phase difference between antenna polarization components; $W_q$ is a spatial-frequency joint base matrix; one spatial-frequency joint base is correspondingly selected for each column vector in $W_q$; $C_1$ is a spatial-frequency joint base correction matrix, and is used to make W q approximate to W; and $C_2$ is a superposition coefficient matrix corresponding to the spatial-frequency joint base matrix, and indicates weights of one or more spatial-frequency joint bases in $W_qC_1$ during weighted summation.

7. The communication apparatus according to claim 6, wherein the first codebook meets the following formula:

$$W=W_1C_1C_2, \text{ wherein}$$

the first codebook is W; $W_1$ is a spatial-frequency joint base matrix.

8. The communication apparatus according to claim 7, wherein $W_1=W_p\otimes W_q$.

9. The communication apparatus according to claim 6, wherein one frequency domain base in the spatial-frequency joint base matrix corresponds to a plurality of spatial domain bases, or one spatial domain base in the spatial-frequency joint base matrix corresponds to a plurality of frequency domain bases, and $W_q$ meets the following formula:

$$W_q=W^*_f\otimes W_s, \text{ wherein } W^*_f \text{ is a conjugate matrix of } W_f, W_f \text{ indicates a frequency domain base, and } W_s \text{ indicates a spatial domain base.}$$

10. The communication apparatus according to claim 6, wherein one frequency domain base in the spatial-frequency joint base matrix corresponds to one spatial domain base, and $W_q$ meets the following formula:

$$W_q=W^*_f\odot W_s, \text{ wherein } W_s \text{ is a conjugate matrix of } W_f, W_f \text{ indicates a frequency domain base, and } W_s \text{ indicates a spatial domain base.}$$

11. The communication apparatus according to claim 6, wherein two polarizations of the channel correspond to different spatial-frequency bases, and the first codebook comprises a codebook corresponding to a first polarization direction and a codebook corresponding to a second polarization direction.

12. A communication apparatus, comprising:

at least one processor, and one or more memories coupled to the at least one processor and configured to store programming instructions for execution by the at least one processor to perform operations comprising:

receiving channel state information, wherein the channel state information is determined based on a first codebook, the first codebook is determined based on a channel represented by one or more spatial-frequency domain column vectors, a length of each of the one or more spatial-frequency domain column vectors is determined based on a number of transmit antenna ports of a terminal, and the one or more spatial-frequency domain column vectors is usable to indicate the channel in joint spatial-frequency domain; and determining a channel state based on the channel state information and the first codebook, wherein two polarizations of the channel correspond to a same spatial-frequency base, and the first codebook meets the following formula:

$$W=(W_p\otimes(W_pC_1))C_2, \text{ wherein}$$

the first codebook is W; $W_p$ represents a phase difference between antenna polarization components; $W_q$ is a spatial-frequency joint base matrix; one spatial-frequency joint base is correspondingly selected for each column vector in $W_q$; $C_1$ is a spatial-frequency joint base correction matrix, and is used to make $W_q$ approximate to W; and $C_2$ is a superposition coefficient matrix corresponding to the spatial-frequency joint base matrix, and indicates weights of one or more spatial-frequency joint bases in $W_qC_1$ during weighted summation.

13. The communication apparatus according to claim 12, wherein the first codebook meets the following formula:

$$W=W_1C_1C_2, \text{ wherein}$$

the first codebook is W; $W_1$ is a spatial-frequency joint base matrix.

14. The communication apparatus according to claim 13, wherein $W_1=W_p\otimes W_q$.

15. The communication apparatus according to claim 12, wherein one frequency domain base in the spatial-frequency joint base matrix corresponds to a plurality of spatial domain bases, or one spatial domain base in the spatial-frequency joint base matrix corresponds to a plurality of frequency domain bases, and $W_q$ meets the following formula:

$$W_q=W^*_f\otimes W_s, \text{ wherein } W^*_f \text{ is a conjugate matrix of } W_f, W_f \text{ indicates a frequency domain base, and } W_s \text{ indicates a spatial domain base.}$$

16. The communication apparatus according to claim 12, wherein one frequency domain base in the spatial-frequency joint base matrix corresponds to one spatial domain base, and $W_q$ meets the following formula:

$$W_q=W^*_f\odot W_s, \text{ wherein } W^*_f \text{ is a conjugate matrix of } W_f, W_f \text{ indicates a frequency domain base, and } W_s \text{ indicates a spatial domain base.}$$

17. The communication apparatus according to claim 12, wherein two polarizations of the channel correspond to different spatial-frequency bases, and the first codebook comprises a codebook corresponding to a first polarization direction and a codebook corresponding to a second polarization direction.

* * * * *